US010227263B2

(12) United States Patent
Nagayama et al.

(10) Patent No.: US 10,227,263 B2
(45) Date of Patent: Mar. 12, 2019

(54) THERMAL SPRAY MATERIAL AND THERMAL SPRAY COATED ARTICLE

(71) Applicants: TOKYO ELECTRON LIMITED, Minato-ku, Tokyo (JP); FUJIMI INCORPORATED, Kiyosu-shi, Aichi (JP)

(72) Inventors: Nobuyuki Nagayama, Miyagi (JP); Hiroyuki Ibe, Kiyosu (JP); Takaya Masuda, Kiyosu (JP)

(73) Assignees: TOKYO ELECTRON LIMITED, Minato-ku, Tokyo (JP); FUJIMI INCORPORATED, Kiyosu-shi, Aichi (JP)

( * ) Notice: Subject to any disclaimer, the term of this patent is extended or adjusted under 35 U.S.C. 154(b) by 0 days.

(21) Appl. No.: 15/800,419

(22) Filed: Nov. 1, 2017

(65) Prior Publication Data
US 2018/0127318 A1    May 10, 2018

(30) Foreign Application Priority Data

Nov. 7, 2016 (JP) ................................. 2016-217287

(51) Int. Cl.
| C04B 35/505 | (2006.01) |
| C04B 35/553 | (2006.01) |
| C04B 35/622 | (2006.01) |
| C04B 35/515 | (2006.01) |
| C04B 35/626 | (2006.01) |
| C04B 41/00 | (2006.01) |
| C23C 4/04 | (2006.01) |

(52) U.S. Cl.
CPC ........ *C04B 35/505* (2013.01); *C04B 35/5152* (2013.01); *C04B 35/553* (2013.01); *C04B 35/62222* (2013.01); *C04B 35/62655* (2013.01); *C04B 35/62695* (2013.01); *C04B 41/00* (2013.01); *C23C 4/04* (2013.01); *C04B 2235/3224* (2013.01); *C04B 2235/3225* (2013.01); *C04B 2235/445* (2013.01); *C04B 2235/5436* (2013.01)

(58) Field of Classification Search
CPC .......................... C04B 35/505; C04B 35/553
See application file for complete search history.

(56) References Cited

U.S. PATENT DOCUMENTS

| 9,388,485 B2 * | 7/2016 | Fukagawa ................. C23C 4/10 |
| 2015/0096462 A1 | 4/2015 | Fukagawa et al. |
| 2016/0326058 A1 * | 11/2016 | Nagayama ................ C23C 4/04 |
| 2016/0326059 A1 * | 11/2016 | Nagayama ............ C04B 35/505 |
| 2016/0326623 A1 * | 11/2016 | Nagayama ................ C23C 4/11 |

(Continued)

FOREIGN PATENT DOCUMENTS

| JP | 5911036 B1 | 4/2016 |
| WO | WO-2014/002580 A1 | 1/2014 |

*Primary Examiner* — Karl E Group
(74) *Attorney, Agent, or Firm* — Foley & Lardner LLP; Benjamin A. Berkowitz

(57) ABSTRACT

Provided is a thermal spray material that can form a compact thermal sprayed coating having an enhanced plasma erosion resistance. The herein disclosed art provides a thermal spray material that contains a rare earth element (RE), oxygen (O), and a halogen element (X) as constituent elements and that contains a mixed crystal of a rare earth element oxyhalide (RE-O—X) and a rare earth element halide ($REX_3$).

8 Claims, 6 Drawing Sheets

(56) References Cited

U.S. PATENT DOCUMENTS

2017/0088930 A1\* 3/2017 Ibe ........................... C23C 4/129
2017/0107604 A1\* 4/2017 Ibe ............................ C23C 4/04
2017/0114440 A1\* 4/2017 Takai ........................ C23C 4/11
2017/0342539 A1\* 11/2017 Sato .......................... C23C 4/04

\* cited by examiner (1) 　　(2)

(1) 　　(2)

200μm

20μm

THERMAL SPRAY MATERIAL AND THERMAL SPRAY COATED ARTICLE

CROSS-REFERENCE

The present application claims priority based on Japanese Patent Application No. 2016-217287 filed Nov. 7, 2016. The contents of that application are incorporated in their entirety in this Specification by reference.

BACKGROUND OF THE INVENTION

1. Field of the Invention

The present invention relates to a thermal spray material and to a thermal spray coated article that is provided with a thermal sprayed coating formed using this thermal spray material.

2. Description of the Related Art

The art of providing new functionalities by using various materials to coat substrate surfaces has been employed in various fields. Thermal spraying is known as one of these surface coating arts. In thermal spraying, for example, thermal sprayed particles containing a material such as a ceramic are sprayed, in a softened or melted state caused by combustion or electrical energy, onto the surface of a substrate to thereby form a thermal sprayed coating comprising the material.

In manufacturing fields, e.g., for semiconductor devices, microprocessing is commonly carried out on the surface of a semiconductor substrate by dry etching using the plasma of a halogen gas such as fluorine, chlorine, or bromine. In addition, after dry etching has been performed, the interior of the chamber (vacuum compartment) from which the semiconductor substrate has been removed is cleaned using an oxygen gas plasma. The potential for erosion thus exists here for members within the chamber that are exposed to these highly reactive oxygen gas plasmas and halogen gas plasmas. Moreover, when material eroded from a member detaches in particulate form, these particles can form foreign material (this foreign material is referred to below as particles) that attaches to the semiconductor substrate and causes circuit defects.

With the goal of reducing the generation of particles, the members exposed to plasmas, e.g., of oxygen gas plasma or halogen gas plasma, in semiconductor device fabrication equipment have been provided with ceramic thermal sprayed coatings having plasma erosion resistance. For example, WO 2014/002580 discloses that yttrium oxyfluoride can have a high plasma erosion resistance and describes the use as a thermal spray material of granules (granular particles) at least partially containing an oxyfluoride of yttrium.

However, as described in Japanese Patent No. 5,911,036, a problem was found with thermal spray materials containing yttrium oxyfluoride, i.e., during formation of the thermal sprayed coating, the fluorine becomes a gas and volatilizes, and due to this the formation of a compact thermal sprayed coating is made more difficult than when other thermal spray materials are used. Another problem was that it was difficult to control the composition of the compounds constituting the thermal sprayed coating by varying the chemical composition of the thermal spray material during thermal spraying. In addition, the increasing integration density of semiconductor devices has been accompanied by requirements for a more precise control of particle-based contamination, and a reduction in the generation of finer particles (improved dusting resistance) is thus also required of the ceramic thermal sprayed coatings disposed on semiconductor device fabrication equipment.

In view of these circumstances, an object of the present invention is to provide a thermal spray material that can form a compact thermal sprayed coating that exhibits an excellent plasma erosion resistance and an excellent dusting resistance. An additional object is to provide a thermal sprayed coating and a thermal spray coated article that are formed using this thermal spray material.

SUMMARY OF THE INVENTION

The present invention provides, as a solution to the problems identified above, a thermal spray material having the following characteristics. That is, the herein disclosed thermal spray material characteristically contains a rare earth element, oxygen, and a halogen element as constituent elements, and contains a mixed crystal of a rare earth element oxyhalide and a rare earth element halide.

Rare earth element oxyhalides are known, for example, to have a better plasma erosion resistance to halogen plasmas than rare earth element halides and rare earth element oxides. However, as disclosed in, for example, WO 2014/002580, the conventional thermal spray materials containing a rare earth element oxyhalide have been produced as a mixture with rare earth element halide and/or rare earth element oxide. In addition, the halogen element in rare earth element oxyhalides readily volatilizes upon exposure to the high-temperature thermal spraying environment, and the composition of the thermal sprayed coating that is formed can then assume large deviations from the composition of the thermal spray material used. Typically, the composition of the thermal sprayed coating can assume a composition in which the thermal spray material has undergone oxidative decomposition to oxide. Thus, even if rare earth element halide remains present in the thermal sprayed coating, the proportion of rare earth element oxide provided by the decomposition of rare earth element oxyhalide can become high. This rare earth element oxide is the source of the production of very fine particles that have not been controlled to date, and thus its presence in the thermal sprayed coating is undesirable. In addition, as pointed out in Japanese Patent No. 5,911,036, in association with the volatilization of the halogen element, pores have tended to be present in relative abundance in the thermal sprayed coating that is formed.

In contrast to the preceding, investigations by the present inventors established that a mixed crystal of a rare earth element oxyhalide and a rare earth element halide, while being a thermal spray material that contained a rare earth element, oxygen, and a halogen element, for example, was more resistant to oxidative decomposition when exposed to thermal spray environments, certainly as compared to rare earth element halides by themselves and even as compared to rare earth element oxyhalides by themselves and their mixtures. Moreover, it was discovered that even when the mixed crystal undergoes oxidative decomposition, the proportion remaining to the rare earth element oxyhalide side in the chemical composition of the decomposition product is very high. Thus, decomposition to the rare earth element oxide due to thermal spraying is impeded. The herein disclosed art was achieved based on this knowledge. As a consequence of this, a thermal spray material is realized that can form a thermal sprayed coating in which the content of rare earth element halide and/or rare earth element oxide is restrained, and which is provided with dusting resistance and plasma erosion resistance with respect to halogen plasmas. In addition, a thermal spray material is provided that can form a thermal sprayed coating that, while containing a rare earth element oxyhalide, has a reduced porosity.

In a preferred aspect of the herein disclosed thermal spray material, it may be a form that is substantially free from a rare earth element halide that is a halide of the rare earth element. That is, preferred embodiments of the thermal spray material may substantially not contain rare earth halides. Another preferred embodiments of the thermal spray material may be a form that is substantially free from a rare earth element oxide that is an oxide of the rare earth element. That is, it can be executed such that the rare earth element halide and/or rare earth element oxide, which have a poorer plasma erosion resistance than the rare earth element oxyhalide, is not contained at the level of the thermal spray material.

By doing this, the dusting resistance of the thermal sprayed coating formed by thermal spraying can be more reliably increased.

In this Specification, "be substantially free from" a particular compound may be, for example, that this compound is not detected by x-ray diffraction analysis.

In a preferred aspect of the herein disclosed thermal spray material, it can be a form that substantially does not contain the aforementioned rare earth element oxyhalide. By doing this, a thermal spray material is provided that is even more resistant to oxidation in a thermal spray environment.

In a preferred aspect of the herein disclosed thermal spray material, the proportion of the rare earth element halide in the mixed crystal is at least 5 mol % and not more than 95 mol %. By doing this, the oxidative decomposition of the mixed crystal in the thermal spray environment can be inhibited in a stable manner.

In a preferred aspect of the herein disclosed thermal spray material, yttrium is incorporated as the rare earth element; fluorine is incorporated as the halogen element; yttrium oxyfluoride is incorporated as the rare earth element oxyhalide; and yttrium fluoride is incorporated as the rare earth element halide. By doing this, for example, a thermal spray material is provided that can advantageously form a thermal sprayed coating that exhibits an excellent dusting resistance and erosion resistance performance versus fluorine plasmas.

In a preferred aspect of the herein disclosed thermal spray material, a powder has an average particle diameter in the range of from 5 μm to 60 μm, inclusive. As a result, a thermal spray material exhibiting excellent flowability and high thermal spray efficiency can be provided.

In a preferred aspect of the herein disclosed thermal spray material, the cumulative pore volume for pore radii of equal to or less than 1 μm in the powder is not more than 0.1 $cm^3/g$. By endowing this thermal spray material with a compact structure, oxidation in the thermal spray environment of the thermal spray particles constituting the powder can be thoroughly inhibited. Moreover, the compactness of the thermal sprayed coating formed using this thermal spray material can also be raised.

In another aspect, the present invention provides a thermal spray coated article comprising a substrate and a thermal sprayed coating provided on the surface of this substrate. This thermal sprayed coating has a porosity of not more than 7% and contains as its main component a rare earth element oxyhalide containing a rare earth element, oxygen, and a halogen element as constituent elements.

The thermal sprayed coating in the herein disclosed thermal spray coated article, even while having a rare earth element oxyhalide as its main component, is realized as a compact thermal sprayed coating having a porosity of not more than 7%. That is, notwithstanding that the thermal spray material is deposited in a satisfactorily melted or softened state by thermal spraying, a compact thermal sprayed coating is formed in a state in which oxidation is suppressed. As a consequence, this thermal sprayed coating is provided as a thermal sprayed coating having a clearly improved plasma erosion resistance and dusting resistance. As a result, a thermal spray coated article is provided that exhibits an excellent plasma erosion resistance and an excellent dusting resistance.

In a preferred aspect of the herein disclosed thermal spray coated article, a rare earth element halide that is a halide of the aforementioned rare earth element is substantially not contained. In addition, a preferred aspect of the herein disclosed thermal spray coated article can be an aspect in which a rare earth element oxide that is an oxide of the aforementioned rare earth element is substantially not contained. By having the thermal sprayed coating not contain a rare earth element halide and/or a rare earth element oxide, the dusting resistance is reliably and secure improved, and this is thus preferred.

In a preferred aspect of the herein disclosed thermal spray coated article, yttrium is incorporated as the rare earth element; fluorine is incorporated as the halogen element; yttrium oxyfluoride is incorporated as the rare earth element oxyhalide; and yttrium fluoride is incorporated as the rare earth element halide. By having this constitution, for example, a thermal sprayed coating can be constituted that has an excellent dusting resistance and erosion resistance performance versus fluorine plasmas.

BRIEF DESCRIPTION OF THE DRAWINGS

For a better understanding of the invention as well as other objects and further features thereof, reference is had to the following detailed description to be read in connection with the accompanying drawings, wherein.

DETAILED DESCRIPTION OF THE PREFERRED EMBODIMENTS

Figure 1:
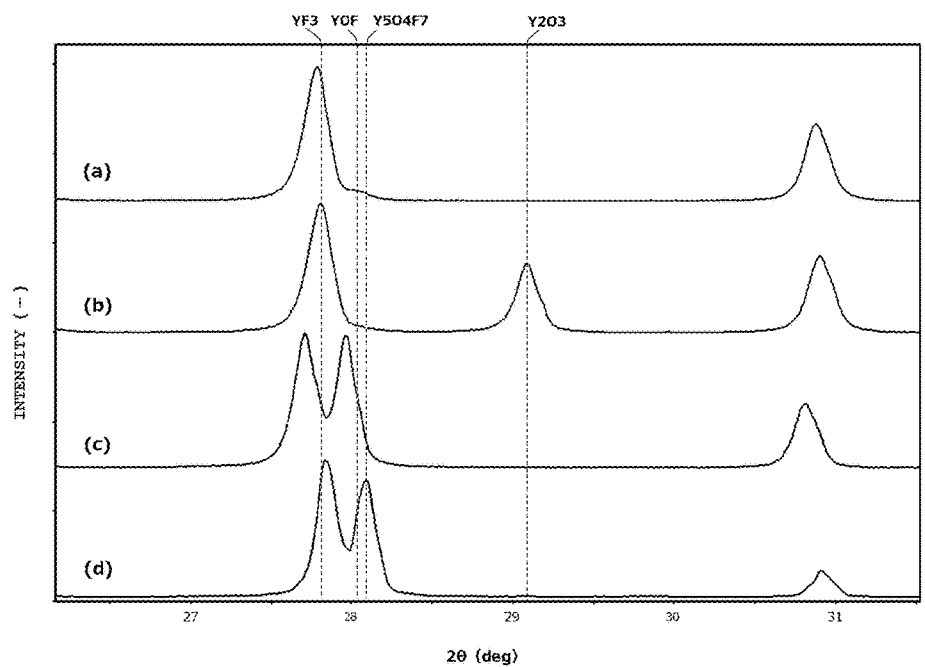
FIG. 1 is a diagram that provides an example of XRD diffraction patterns (a) to (d) resulting from four powders.

Preferred embodiments of the present invention are described in the following. Matters required for the execution of the present invention but not particularly described in this Specification can be understood as design matters for the person having ordinary skill in the art based on the conventional art in the pertinent field. The present invention can be implemented based on the contents disclosed in this Specification and the common general technical knowledge in the pertinent field. Unless specifically indicated otherwise, the expression "X to Y" indicating a range of numerical values means "at least X and not more than Y" in this Specification.

The Thermal Spray Material

The herein disclosed thermal spray material contains a rare earth element (RE), oxygen (O), and a halogen element (X) as constituent elements. This thermal spray material characteristically contains a mixed crystal of a rare earth element oxyhalide (RE-O—X) and a rare earth element halide (RE-X). It is thought that, through the formation of a mixed crystal of a rare earth element oxyhalide and a rare earth element halide, even in the high-temperature environment due to thermal spraying, the solid solution ratios in the composition change with each other and a stable state can be maintained and oxidative decomposition to other compounds (for example, $Y_2O_3$, $F_2$, and so forth) can be inhibited.

This mixed crystal may refer to the uniform intermixture of two or more substances having different chemical compositions to make an approximately crystallographically uniform solid phase. The meaning of mixed crystal also encompasses the concepts corresponding to the terms "solid solution", "alloy", and so forth that are used mainly with reference to metal materials. In the herein disclosed art, a rare earth element oxyhalide (RE-O—X), which is a compound of a rare earth element (RE), oxygen (O), and a halogen element (X), forms a mixed crystal with a rare earth element halide (RE-X), which is a compound of a rare earth element (RE) and a halogen compound (X). When this occurs, the rare earth element oxyhalide in the mixed crystal composition can, based on the presence of the rare earth element halide, assume a state containing a relative abundance of the halogen element within the crystal phase. For example, the rare earth element oxyhalide can be understood as being in a state in which a halogen element is supplied (doped) from the rare earth element halide.

In addition, through the formation of a mixed crystal of two or more different compounds, for example, even when the element ratios of the elements constituting these compounds are changed due to the thermal spraying environment, this can be absorbed as a change in the mixing proportions (referred to below as, for example, the "solid solution ratios") of these compounds in the mixed crystal. For example, the present inventors have confirmed that a rare earth element oxyhalide and a rare earth element halide form a mixed crystal throughout almost the complete composition range (entire mixing proportions) excluding the pure components. Thus, the mixed crystal of rare earth element oxyhalide and rare earth element halide can be an all-proportional solid solution. As a consequence of this, even when the halogen element volatilizes upon exposure to the thermal spray environment, the herein disclosed thermal spray material can maintain a mixed crystal state without chemical reactions such as oxidation of the compounds, or significant change of the crystal structure.

Specifically, for example, yttrium oxyfluoride ($Y_5O_4F_7$) and yttrium fluoride ($YF_3$) are independently readily decomposed by the thermal spray environment directly to the oxide based on the following equations (1) and (2). This results in the production of the rare earth element oxide and halogen gas.

$$Y_5O_4F_7 + 7/4O_2 \rightarrow 5/2Y_2O_3 + 7/2F_2\uparrow \qquad (1)$$

$$2YF_3 + 3/2O_2 \rightarrow Y_2O_3 + 3F_2\uparrow \qquad (2)$$

However, by having these compounds be a mixed crystal, as shown in equation (3) below, even when oxidation occurs in the thermal spray environment and halogen gas is volatilized, decomposition to the oxide is suppressed through a change in the mixed crystal composition.

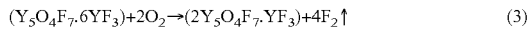

$$(Y_5O_4F_7 \cdot 6YF_3) + 2O_2 \rightarrow (2Y_5O_4F_7 \cdot YF_3) + 4F_2\uparrow \qquad (3)$$

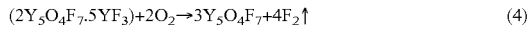

$$(2Y_5O_4F_7 \cdot 5YF_3) + 2O_2 \rightarrow 3Y_5O_4F_7 + 4F_2\uparrow \qquad (4)$$

$$Y_5O_4F_7 + 1/2O_2 \rightarrow 5YOF + F_2\uparrow \qquad (5)$$

In addition, as shown in equation (4), with the mixed crystal, direct oxidation to the oxide can be suppressed until the thermal spray material becomes the pure component. When there is a solid solution limit for the mixed crystal, direct oxidation to the oxide is suppressed until the solid solution limit composition is reached. In addition, even when the mixed crystal undergoes oxidative decomposition, the chemical composition of the decomposition product can be guided to the side of the rare earth element oxyhalide that is one compound (pure component) constituting the mixed crystal. Moreover, when the rare earth element oxyhalide is a compound having a high proportion of halogen element, the oxide is formed after conversion, as shown in equation (5), to a rare earth element oxyhalide having a lower proportion of halogen element. The production of rare earth element oxide can be suppressed even further as a result. As a consequence of the preceding, the herein disclosed thermal spray material, while containing a rare earth element, oxygen, and a halogen element, for example, is more resistant to oxidative decomposition when exposed to thermal spray environments, certainly as compared to rare earth element halides by themselves and even as compared to rare earth element oxyhalides by themselves and their mixtures. These functional effects are characteristics inherent to the thermal spray material and can be substantial effects that manifest regardless of the thermal spray method.

In the formulas given above, for example, the expression "$Y_5O_4F_7 \cdot 6YF_3$" indicates that a mixed crystal has been formed in which $Y_5O_4F_7$ and $YF_3$ are mixed at a proportion of 1:6 as the molar ratio.

There are no particular limitations in the herein disclosed art on the rare earth element (RE) constituting the mixed crystal, and a suitable selection can be made from scandium, yttrium, and the lanthanoid elements. These are specifically scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). For instance, Y, La, Gd, Tb, Eu, Yb, Dy, and Ce are preferred from the standpoints of bringing about an improved plasma erosion resistance, their relatively low costs, and so forth. A single one of these may be incorporated by itself as the rare earth element, or a combination of two or more may be incorporated.

There are also no particular limitations on the halogen element (X), and this may be any element belonging to group 17 of the Periodic Table of the Elements. Specific examples are the halogen elements fluorine (F), chlorine (Cl), bromine (Br), iodine (I), and astatine (At). F, Cl, and Br are preferred. A single one of these may be incorporated by itself or two or more may be incorporated.

There are no particular limitations here on the composition of the rare earth element oxyhalide (RE-O—X) that constitutes the mixed crystal. There are also no particular limitations on the combination of rare earth element (RE) and halogen element (X) constituting this rare earth element oxyhalide or on the proportions of the rare earth element (RE), halogen element (X), and oxygen (O). Typical examples of the rare earth element oxyhalide are the oxyfluorides, oxychlorides, and oxybromides of the various rare earth elements. From the standpoint of its formation of a mixed crystal with a rare earth element halide, infra, this rare earth element oxyhalide preferably has a common crystal structure with the rare earth element halide. Such a crystal structure may be, for example, cubic, tetragonal, rhombohedral, hexagonal, orthorhombic (tetragonal), monoclinic, or triclinic. Among the preceding, for the rare earth element oxyhalides, for example, the crystal structure is preferably orthorhombic and/or rhombohedral, which are crystal structures for oxyfluorides of rare earth elements given by the general formula $RE_1O_{1-n}F_{1+2n}$ (n in the general formula satisfies 0≤n<1), which are known to have a relatively high erosion resistance versus halogen plasmas. Orthorhombic, which is the crystal structure when n in the preceding general formula is 0<n<1, is preferred.

In addition, there are no particular limitations on the composition of the rare earth element halide (RE-X) constituting the mixed crystal. There are also no particular limitations on the combination of the rare earth element (RE) and halogen element (X) that constitute this rare earth element halide or on the proportions thereof. Typical examples of the rare earth element halide are the fluorides, chlorides, and bromides of the various rare earth elements. From the standpoint of its formation of a mixed crystal with a rare earth element oxyhalide as described above, this rare earth element halide preferably has a common crystal structure with the rare earth element oxyhalide. Such a crystal structure may be, for example, cubic, tetragonal, rhombohedral, hexagonal, orthorhombic (tetragonal), monoclinic, or triclinic. Among the preceding, orthorhombic and/or rhombohedral is preferred and orthorhombic is more preferred. A rare earth element halide having an orthorhombic crystal structure can be exemplified by rare earth element fluorides given by the general formula $REF_3$, which are known to have a relatively high erosion resistance versus halogen plasmas.

In order for the aforementioned rare earth element halide and rare earth element oxyhalide to form a mixed crystal, preferably the sizes of their crystal lattices (unit cells) are close to each other. Accordingly, the rare earth element halide and rare earth element oxyhalide can contain a common rare earth element. For example, at least 50 mol % (preferably at least 70 mol %, more preferably at least 80 mol %, and particularly preferably at least 90 mol %, for example, at least 95 mol % and substantially 100 mol %) of the rare earth element contained in each of the rare earth element oxyhalide and rare earth element halide may be a common element.

The aforementioned rare earth element oxyhalide and rare earth element halide can assume the same crystal structure or similar crystal structures even when the rare earth element and halogen element are different. Accordingly, a preferred embodiment described in the following is the case in which the rare earth element includes yttrium (Y), the halogen element includes fluorine (F), the rare earth element halide includes yttrium fluoride ($YF_3$), and the rare earth element oxyhalide includes yttrium oxyfluoride (Y—O—F). This yttrium oxyfluoride may be, for example, a compound given by the general formula $Y_1O_{1-n}F_{1+2n}$ (0<n<1 is satisfied in the general formula), which is thermodynamically stable, e.g., $Y_5O_4F_7$, in which the ratio among the yttrium, oxygen, and halogen element in the chemical composition is 5:4:7, and otherwise YOF, $Y_6O_5F_8$, $Y_7O_6F_9$, $Y_{17}O_{14}F_{23}$, and so forth. It may be in particular $Y_5O_4F_7$, which can form a preferred mixed crystal with yttrium fluoride and which has a high proportion of fluorine relative to oxygen. Also in the description that follows, all or a portion of the yttrium (Y) can be replaced by any rare earth element, and all or a portion of the fluorine (F) can be replaced by any halogen element.

The proportions (also referred to as the solid solution ratios) for the rare earth element oxyhalide and rare earth element halide in the herein disclosed mixed crystal are not particularly limited. The mixing (effecting a solid solution) of at least a rare earth element halide with a rare earth element oxyhalide is preferred because this increases the proportion of halogen element to rare earth element present in the mixed crystal and suppresses the oxidative decomposition of the rare earth element oxyhalide. From this standpoint, the proportion of the rare earth element halide in the total of the rare earth element oxyhalide and rare earth element halide constituting the mixed crystal is preferably at least 5 mol %, more preferably at least 20 mol %, and particularly preferably at least 40 mol %, and can be, for example, at least 50 mol %. It may be, for example, at least 60 mol % or at least 70 mol %. However, when the proportion of the rare earth element halide in the mixed crystal becomes excessive, the halogen element will readily volatilize in the high-temperature environment during thermal spraying and the contribution to an inhibition of oxidation may then be impaired. From this standpoint, the proportion of the rare earth element halide in the mixed crystal is preferably not more than 95 mol %, more preferably not more than 90 mol %, and particularly preferably not more than 85 mol %.

More directly, the herein disclosed thermal spray material, because it contains a mixed crystal of a rare earth element oxyhalide and a rare earth element halide as described in the preceding, has a higher proportion of halogen element than a thermal spray material composed of rare earth element oxyhalide. In the present thermal spray material, the proportion of the halogen element in the total of the rare earth element, oxygen, and halogen element is preferably at least 45 atom % and more preferably at least 50 atom % and is, for example, at least 53 atom %. However, an excessive halogen element content in the thermal spray material is undesirable because the halogen element will then readily volatilize from the thermal spray material during thermal spraying. Accordingly, in the thermal spray material, the proportion of the halogen element in the total of the rare earth element, oxygen, and halogen element is preferably not more than 73 atom % and is more preferably not more than 70 atom % and is, for example, not more than 65 atom %.

The method for determining that the aforementioned mixed crystal is present in the thermal spray material is not particularly limited, but, for example, the determination can be carried out by the following method.

First, the composition and crystal structure of the thermal spray material are investigated by X-ray Diffraction (XRD). In the XRD diffraction pattern of a mixed crystal, for example, each of the diffraction patterns for the two compounds themselves that constitute the mixed crystal can be observed, for example, in a form shifted to the low angle side. Accordingly, the crystal structures of the substances contained in the thermal spray material are first identified by XRD analysis of the thermal spray material. Here, when a rare earth element oxyhalide or rare earth element halide separate from the mixed crystal is identified, its composition (valence, element ratio) may also be determined. The presence of a mixed crystal of a rare earth element oxyhalide and rare earth element halide is confirmed when, for the obtained diffraction pattern, a diffraction pattern is observed having a form in which the diffraction patterns of the rare earth element oxyhalide and rare earth element halide constituting the mixed crystal are each shifted while maintaining their shapes as such.

For example, images of XRD diffraction patterns for four powders (a) to (d) are given in FIG. 1. Considered from the left side, the vertical lines in FIG. 1 indicate, respectively, the main peak position for the $YF_3$ crystal phase (27.881°), the main peak position for the YOF crystal phase (28.064°), the main peak position for the $Y_5O_4F_7$ crystal phase (28.114°), and the main peak position for the $Y_2O_3$ crystal phase (29.157°). The peak in the vicinity of 31° is a peak assigned to $YF_3$.

Here, the powder (d) is a mixed powder provided by mixing a $YF_3$ powder and a $Y_5O_4F_7$ powder, and the diffraction peak based on the $YF_3$ crystal phase and the diffraction peak based on the $Y_5O_4F_7$ crystal phase are each observed in the XRD pattern. The powder (a) is a fired powder provided by firing a $YF_3$ granulated powder, and a weak diffraction peak based on the YOF crystal phase is observed at the diffraction peak based on the $YF_3$ crystal phrase, which is the main phase. The powder (b) is a granulated powder from a $YF_3$ powder and a $Y_2O_3$ powder, and diffraction peaks based on the $YF_3$ crystal phase and the $Y_2O_3$ crystal phase are each observed. The powder (c) is a mixed crystal powder composed of a mixed crystal for which the starting materials are $YF_3$ powder and $Y_5O_4F_7$ powder. However, the diffraction peaks assigned to the $YF_3$ crystal phrase and $Y_2O_3$ crystal phase are not seen in the XRD pattern for powder (c). In addition, the XRD pattern for powder (c) is shown to match, in a form shifted to the low angle side, the diffraction pattern for the powder (d), which are a mixed powder of $YF_3$ powder and $Y_5O_4F_7$ powder. For example, a mixed crystal content can be confirmed in this manner.

The presence of the mixed crystal can also be confirmed by x-ray photoelectron spectroscopy (XPS). However, the execution of XPS analysis on a powdered thermal spray material can be problematic in some instances. Due to this, the presence/absence of the mixed crystal in the thermal spray material can be advantageously confirmed using the XRD analysis described above. While not being particularly limiting, for the thermal sprayed coatings described below, for example, the presence/absence of the mixed crystal can be confirmed by XPS analysis. The presence/absence of the mixed crystal can be confirmed by XPS analysis for some thermal spray materials.

For confirmation of the mixed crystal by XPS analysis, the constituent elements of the thermal spray material and their electronic states are first measured by XPS analysis and the like. By exposing the thermal spray material to x-rays, the electrons in the atomic orbitals are excited and are ejected as photoelectrons. Because the binding energies of the ejected electrons in this case provide orbital energies inherent to a particular element and its oxidation state, information on the type of elements constituting the thermal spray material and their oxidation states can be obtained by measuring the x-ray photoelectron spectrum. For example, the element distribution at the surface (typically a surface depth of several nanometers) of the thermal spray material substance can be measured and the atomic ratios for the rare earth element (RE), halogen element (X), and oxygen (O) present in the thermal spray material can be acquired.

For example, the XPS spectrum of the 3d orbital of a rare earth element (yttrium in the following example) has two components and is split into $3d_{5/2}$ and $3d_{3/2}$. The $3d_{5/2}$ peak is seen on the lower energy side and the $3d_{3/2}$ peak is seen on the higher energy side. Table 1 gives an example of the measurement of the binding energy of the $3d_{5/2}$ orbital electrons for yttrium (Y) metal, yttrium oxide ($Y_2O_3$), oxyfluorides of yttrium (YOF, $Y_5O_4F_7$), halides of yttrium ($YF_3$, $YBr_3$, $YCl_3$, $YI_3$), and their mixed crystals ($Y_2O_3$/Y, YOF/$Y_2O_3$, $YF_3$/$Y_5O_4F_7$). As shown in Table 1, for example, the $3d_{5/2}$ peak for the mixed crystal is shown to occur between the $3d_{5/2}$ peaks of the compounds that form the mixed crystal. Specifically, for example, the XPS peak for the $3d_{5/2}$ orbital of yttrium fluoride ($YF_3$) occurs at approximately 159.5 to 160.5 eV. For reference, the XPS peak for the $3d_{3/2}$ orbital of yttrium fluoride occurs in the neighborhood of 161.2 eV. On the other hand, for example, the XPS peak for the $3d_{5/2}$ orbital of the Y in yttrium oxyfluoride ($Y_5O_4F_7$) occurs at between approximately 158.25 to 159 eV. The XPS peak for the 3d orbital for the mixed crystal of yttrium oxyfluoride and yttrium fluoride ($YF_3$/$Y_5O_4F_7$) appears at between (159.0 to 159.5 eV) the peak for yttrium oxyfluoride and the peak for yttrium fluoride. However, here, a peak for $3d_{3/2}$ is not seen on the higher energy side with the mixed crystal. In other words, with the mixed crystal, the XPS spectrum for the 3d orbital of yttrium can aggregate to the $3d_{5/2}$ peak on the lower energy side. While the details of this phenomenon are not clear, it is thought that the $3d_{3/2}$ peak for yttrium is extinguished or undergoes a large shift to the $3d_{5/2}$ side. That is, for the mixed crystal, the presence of the mixed crystal of yttrium oxyfluoride and yttrium fluoride can be confirmed by the measurement of one XPS peak in the energy range of at least 157 to 159 eV. While shown specifically in the examples given below, for example, when the thermal sprayed coating contains mixed crystals, only one peak is observed in the XPS spectrum for the yttrium 3d orbital and a second peak on the higher energy side is not observed. Based on the preceding, in this Specification, the presence of a mixed crystal of yttrium oxyfluoride and yttrium fluoride in the thermal sprayed coating can be understood to correspond to the fact that, for this material, the XPS spectrum deriving from the 3d orbital of yttrium presents only a single observation, which is in the range at a position in the vicinity of the $3d_{5/2}$ orbital (for example, approximately 159 to 159.5 eV). Alternatively, it can be understood to correspond to the fact that a $3d_{3/2}$ peak on the higher energy side is not seen.

TABLE 1

Binding Energies of the Y $3d_{5/2}$ Orbital
Table 1. Binding Energies of the Y $3d_{5/2}$ Orbital

| chemical state | binding energy [eV] |
| --- | --- |
| Y | 155.5 to 156 |
| $Y_2O_3$/Y | 156 to 156.4 |
| $Y_2O_3$ | 156.4 to 157.0 |
| YOF/$Y_2O_3$ | 157.1 to 157.74 |
| YOF | 157.75 to 158.24 |
| $Y_5O_4F_7$ | 158.25 to 159.0 |
| $YF_3$/$Y_5O_4F_7$ | 159.0 to 159.5 |
| $YF_3$ | 159.5 to 160.5 |
| $YBr_3$ | (160.8) |
| $YCl_3$ | (161.0) |
| $YI_3$ | (160.4) |

The proportions (solid solution ratios) for each of the rare earth element oxyhalide and rare earth element halide in the mixed crystal can be acquired, for example, from the ratio of the main peaks in XRD analysis for the rare earth element oxyhalide and the rare earth element halide. More specifically, for example, a calibration curve showing the relationship between the peak height of a specified peak (for example, the main peak for each phase) and the solid solution ratio is constructed by preparing multiple mixed crystal samples having different solid solution ratios for the rare earth element oxyhalide and rare earth element halide and carrying out XRD analysis on each sample. The solid solution ratios (contents) of the rare earth element oxyhalide and rare earth element halide can be quantitated by locating, on this calibration curve, the height of the peak originating from the mixed crystal in the thermal spray material for which measurement of the solid solution ratio is desired. The solid solution ratio can also be quantitated by similarly adopting the calibration curve procedure with the XPS spectral position of the yttrium 3d orbital in XPS analysis of the mixed crystal. The method for confirming the presence of the mixed crystal, the calculation of its solid solution ratios, and so forth are not limited to or by the examples given in the preceding, and various favorable analytic methods can be adopted as appropriate by the person having ordinary skill in the art.

In addition, for example, energy dispersive X-ray spectrometry (EDX) may be adopted in order to perform compositional analysis of the thermal spray material. The use of EDX analysis makes possible analysis of the constituent elements of the thermal spray material to a depth from the surface from about several tens of μm to about several cm and enables acquisition of the bulk composition with good accuracy.

This mixed crystal, through its even slight incorporation in the thermal spray material, can suppress the oxidative decomposition of the thermal spray material during thermal spraying. Thus, the content—in the thermal sprayed coating that is formed—of rare earth element oxides (for example, yttria ($Y_2O_3$)), which have a poor dusting resistance, and/or rare earth element oxyfluorides having a higher oxygen content, can be reduced. In addition, the incorporation of bubbles in the thermal sprayed coating that accompanies oxidative decomposition of the thermal spray material can be suppressed and a compact thermal sprayed coating can then be formed. Accordingly, with regard to the proportion for the mixed crystal, while it is desirably incorporated in the thermal spray material even in small amounts (for example, at least 1 mass %), the proportion for the mixed crystal in order to clearly obtain these effects, for example, is preferably at least 30 mass %, more preferably at least 50 mass %, still more preferably at least 75 mass %, and particularly preferably at least 80 mass %. The proportion for the mixed crystal may be at least 90 mass %, at least 95 mass %, or at least 98 mass %, for example, at least 99 mass %. Substantially 100 mass % of the thermal spray material may be the mixed crystal.

In this Specification, the indication that "substantially 100 mass %" is a particular compound (for example, the mixed crystal) can mean, for example, that compounds other than the particular compound (for example, the mixed crystal), excluding unavoidable impurities, are not detected by x-ray diffraction analysis.

The content in the thermal spray material of rare earth element oxide (typically the rare earth element oxide as such, for example, $Y_2O_3$), which has an inferior dusting resistance as compared to the mixed crystal, rare earth element oxyhalides, and rare earth element fluorides, is preferably kept down. Rare earth element oxide is preferably not more than 10 mass % of the thermal spray material and is preferably not more than 5 mass % and particularly preferably not more than 3 mass %. For example, the thermal spray material more preferably substantially does not contain rare earth element oxide.

Similarly, the content in the thermal spray material of rare earth element halide (typically the rare earth element halide as such, for example, $YF_3$) not constituting the mixed crystal is preferably kept down. Rare earth element halide is preferably not more than 20 mass %, preferably not more than 10 mass % and particularly preferably not more than 5 mass % and may be, for example, not more than 3 mass %. For example, the thermal spray material more preferably substantially does not contain rare earth element halide.

Moreover, the content in the thermal spray material of rare earth element oxyhalide (typically the rare earth element oxyhalide as such, for example, YOF or $Y_5O_4F_7$) not constituting the mixed crystal is preferably kept down. Rare earth element oxyhalide is preferably not more than 20 mass %, preferably not more than 10 mass % and particularly preferably not more than 5 mass % and may be, for example, not more than 3 mass %. For example, the thermal spray material more preferably substantially does not contain rare earth element oxyhalide.

Rare earth element oxide contained in the thermal spray material can be contained as the rare earth element oxide as such in the thermal sprayed coating provided by thermal spraying. For example, yttrium oxide contained in the thermal spray material can be present as yttrium oxide as such in the thermal sprayed coating provided by thermal spraying. This rare earth element oxide (for example, yttrium oxide) has a lower plasma resistance than rare earth element oxyhalide. Due to this, regions containing a rare earth element oxide readily produce a very brittle modification layer, and when exposed to a halogen layer the modification layer converts to very fine particles and readily exfoliates. These very fine particles may deposit as particles on the semiconductor substrate. The presence of rare earth element oxide, which readily forms a modification layer that functions as a particle source, is therefore excluded from the herein disclosed thermal spray material. Moreover, rare earth element oxyhalides are provided with a relatively high plasma erosion resistance performance, but in a plasma environment the halogen readily volatilizes therefrom and a portion of the rare earth element oxyhalide undergoes oxidative decomposition and a trend is assumed of facile decomposition to rare earth element oxide or rare earth element oxyhalide having a higher oxygen content. Accordingly, with the herein disclosed thermal spray material, the rare earth element oxyhalide also is contained as the mixed crystal with rare earth element halide, so as to inhibit oxidative decomposition during exposure to a halogen plasma.

The halogen plasma in the herein disclosed art is typically a plasma produced using a plasma generation gas that contains a halogen gas (halogen compound gas). For example, in specific terms, typical examples are plasmas generated using one of the following by itself or using a mixture of two or more of the following, which are used in, for example, the dry etching step during semiconductor substrate fabrication: a fluorine gas such as $SF_6$, $CF_4$, $CHF_3$, $ClF_3$, and HF; a chlorine gas such as $Cl_2$, $BCl_3$, and HCl; and a bromine gas such as HBr. These gases may be used as a mixed gas with an inert gas such as argon (Ar).

The thermal spray material is typically provided in the form of a powder. This powder may be a powder constituted mainly of a population of primary particles (including aggregates) or may be constituted of granular particles provided by the granulation of finer primary particles. However, from the standpoint of inhibiting the oxidation of the thermal spray material by thermal spraying, it is preferably not a granular particle, which can have a large specific surface area. From the standpoint of the thermal spray efficiency, for example, the average particle diameter of the particles constituting the powder should be about 100 μm or less, but is not otherwise particularly limited, and there are also no particular limitations on the lower limit for the average particle diameter. The average particle diameter of the thermal spray material can be, for example, not more than 80 μm and can be preferably not more than 60 μm and more preferably not more than about 50 μm and, for example, can be not more than about 40 μm. The lower limit on the average particle diameter is also not particularly limited, and, when the flowability of this thermal spray material is considered, for example, can be at least 5 μm and is preferably at least 10 μm and more preferably at least 15 μm and can be, for example, at least 20 μm.

In this Specification, the "average particle diameter" for the thermal spray material is the particle diameter (cumulative 50% particle diameter, $D_{50}$) at a 50% cumulative value in the volume-based particle size distribution measured using a particle size distribution analyzer based on a laser diffraction/scattering procedure.

From the standpoint of a favorable inhibition of oxidation during thermal spraying, the specific surface area of the thermal spray material is preferably less than 0.1 $m^2/g$. The specific surface area is preferably not more than 0.098 $m^2/g$, more preferably not more than 0.095 $m^2/g$, and particularly preferably not more than 0.093 $m^2/g$. Such small specific surface areas, for example, are values that cannot be realized with granular particles having the preferred average particle diameters indicated above.

A value calculated based on the BET method can be adopted for the specific surface area of the thermal spray material. Specifically, the amount of gas adsorption in a monomolecular layer is determined based on the BET method from the adsorption isotherm obtained for the thermal spray material by a gas adsorption procedure, and the specific area is calculated based on the molecular size of the adsorbed gas. The specific surface area of this thermal spray material can be measured based on the instructions in JIS Z 8830:2013 (ISO 9277:2010), "Determination of the specific surface area of powders (solids) by gas adsorption". For example, measurement of the specific surface area of the thermal spray particles can be carried out using a surface area analyzer with the product name "FlowSorb II 2300" from the Micromeritics Instrument Corp.

Similarly, viewed from the standpoint of achieving a favorable inhibition of oxidation during thermal spraying and providing a more compact thermal sprayed coating and thereby raising the plasma erosion resistance and dusting resistance, the surface of the thermal spray particles constituting the thermal spray material preferably lacks peaks and valleys and is smooth. For example, the cumulative pore volume in the thermal spray material for pores with radii of not more than 1 μm can be not more than 0.1 $cm^3/g$. This cumulative pore volume may be not more than 0.05 $cm^3/g$ and is preferably not more than 0.03 $cm^3/g$ or not more than 0.02 $cm^3/g$. This cumulative pore volume is more preferably not more than 0.01 $cm^3/g$. The thermal spray material preferably has such a small cumulative pore volume for pore radii of not more than 1 μm because this enables the formation of a compact thermal sprayed coating. Such small cumulative pore volumes, for example, are values that cannot be realized with granular particles having the preferred average particle diameters indicated above.

The cumulative pore volume of the thermal spray material can be determined based on the mercury intrusion technique. The mercury intrusion technique is a method that utilizes the large surface tension of mercury and that determines the pore distribution from the meso region to the macro region from the relationship between the pressure applied in order to cause the intrusion of mercury into the pores of the powder and the amount of mercury thereby intruded. Measurement of the pore distribution based on the mercury intrusion technique can be carried out based on, for example, JIS R 1655:2003 (Test methods for pore size distribution of fine ceramic green body by mercury porosimetry). For example, the cumulative pore volume of the thermal spray material can be measured using a mercury intrusion porosimeter (Poresizer 9320, Shimadzu Corporation).

From the standpoint of increasing the flowability, the thermal spray particles contained in the thermal spray material preferably have an average circularity in planar view of at least 0.5, although there is not necessarily a limitation to this. The average circularity is more preferably at least 0.55 and is particularly preferably at least 0.6. There are no particular limitations on the upper limit on the average circularity, but the herein disclosed thermal spray material, from the fact that it is constituted from a uniform matrix, can typically have a value of less than 1 for the average circularity.

The arithmetic average value for the circularity in planar view of at least 5,000 particles constituting the thermal spray material, as obtained using an image analysis procedure, can be adopted for the average circularity in this Specification. The circularity can be measured as follows. Thus, specifically, a measurement sample is first prepared by dispersing the thermal spray material in a measurement dispersion medium. The measurement dispersion medium should inhibit the aggregation of the thermal spray particles in the thermal spray material and should enable conversion of the thermal spray particles into a dispersed state, but is not otherwise particularly limited. In the present embodiment, deionized water containing the surfactant polyoxyethylene sorbitan monolaurate at a concentration of 0.1 mass % was used as the measurement dispersion medium. The proportion of the thermal spray material in the measurement sample was made not more than 30 mass % (30 mass % in the present embodiment). The thusly prepared measurement sample is flowed into a measurement vessel, e.g., a glass cell, to form a flat sample flow in which thermal spray particle overlap is suppressed. By exposing this sample flow to strobe light and capturing images, static images are acquired of the thermal spray particles flowing suspended in the measurement sample. The circularity is determined by carrying out image analysis on the resulting static images of the thermal spray particles. The circularity is defined using the following formula: (circularity)=(length of the circumference of a circle having the same area as the thermal spray particle image)/(length of the perimeter of the thermal spray particle). Thus, the circularity is calculated from the projected area and perimeter length per one thermal spray particle. This circularity is determined for at least 5,000 thermal spray particles, and the arithmetic average value thereof is taken to be the average circularity. The value calculated using a flow-type particle image analyzer (FPIA-2100, Sysmex Corporation) is used for this average circularity in this Specification.

The Method of Producing the Thermal Spray Material

Figure 2:
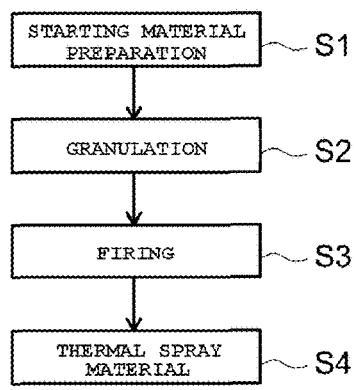
FIG. 2 is a flow chart that shows an example of the method of producing a thermal spray material according to an embodiment.

The thermal spray material can be advantageously produced, for example, according to the following method for producing a thermal spray material, although there is not necessarily a limitation to this. FIG. 2 contains a flow chart of one embodiment of a method for producing the thermal spray material.

(S1) Preparation of Starting Materials

Thus, the starting materials for the thermal spray material are first prepared. For example, powders of the rare earth element halide and rare earth element oxide that will constitute the desired mixed crystal can be used as the starting materials. The properties of the powders used as the starting materials are not particularly limited, but in order to form a mixed crystal having a uniform composition, for example, a microfine powder having an average particle diameter of about at least 0.1 µm and not more than 10 µm is preferred. The mixing proportions for the rare earth element halide powder and rare earth element oxide powder can be determined in correspondence to the mixing proportions (solid solution ratios) in the desired mixed crystal. For example, the desired solid solution ratios may be adopted as such for the mixing proportions of the starting powders. When a powder other than those of the rare earth element halide and rare earth element oxide is used as a starting material, the compound used as the starting material and its proportion may be adjusted as appropriate so as to obtain the mixed crystal having the desired stoichiometric composition.

(S2) Granulation

The prepared starting powder is then granulated into a spherical shape to produce a granulated powder. By proceeding through this granulation step, the production of angular particles in the ensuing firing step can be prevented and a spherical thermal spray material having an excellent flowability can be advantageously obtained. There are no particular limitations on the granulation method and the various known granulation methods can be adopted. For example, specifically, one or more of the following methods can be adopted: rolling granulation, fluid bed granulation, stirred granulation, compression granulation, extrusion granulation, grinding/granulation, spray drying, and so forth. Spray drying is preferably adopted from the standpoint of enabling the convenient and highly precise uniform mixing of the starting powders through the use of a dispersion medium. The type of dispersion medium used in spray drying is not particularly limited and can exemplified by water, lower alcohols (for example, alcohols having 5 or fewer carbons, e.g., methanol, ethanol, and propanol), and their mixtures. A binder may optionally also be added to the dispersion medium. While the granulation conditions cannot be unconditionally stated because they vary with the equipment used, for example, granulation is preferably carried out in the atmosphere in the temperature range of not more than 400° C. (for example, the drying temperature is about 120° C. to 300° C.). The size of the granular particles in the granulated powder may be determined considering the average particle diameter of the starting powders and the shrinkage caused by the firing step that is the next step.

(S3) Firing

The granulated powder provided by granulation is subsequently fired. During firing, the individual starting material particles present in the granulated particles are sintered. During this sintering, the starting components undergo interdiffusion and form a mixed crystal. In the herein disclosed thermal spray material, the starting material particles present in the granular particles are preferably caused to undergo a thorough sintering or melting and unification. That is, preferably unification is carried out to the degree that a granular appearance is almost not seen. The conditions for firing and melting and unification can be exemplified by firing in an inert atmosphere at about 900° C. to 1,200° C. The firing time is not particularly limited because it also varies with the form of the granular particle, but, for example, about at least 1 hour and not more than 24 hours (for example, at least 8 hours and not more than 15 hours) can be regarded as a reference. Common batch firing furnaces, continuous firing furnaces, and so forth can be used without particular limitation for firing the granulated powder. The firing atmosphere can be, for example, an inert atmosphere so as to avoid altering the blended composition. The inert atmosphere can be exemplified by rare gas atmospheres, for example, argon (Ar) and neon (Ne); nonoxidizing atmospheres, e.g., nitrogen ($N_2$); and a vacuum atmosphere. When a batch firing furnace is used, for example, the atmosphere within the furnace may be made an inert atmosphere. When a continuous firing furnace is used, for example, firing may be performed by introducing an inert gas flow of, e.g., a rare gas or nitrogen, into the region within the firing furnace where heating is carried out (the region where sintering is developed). The atmosphere and an air atmosphere are conditions to be avoided because oxidation of the starting components during the sintering step cannot be avoided with these. While not being essential steps, steps such as pulverization of the fired material and its classification may be included on an optional basis after firing. By doing this, the herein disclosed thermal spray material can be obtained (S4).

The usual known granulated powders are in a state in which the microfine particles that are the primary particles are simply aggregated together, for example, via a binder (bonding by a binder), or can be in a state in which this is sintered to provide strength. Relatively large pores are present in the gaps between the microfine particles in such a granulated powder, and peaks and valleys corresponding to the shape of the microfine particle diameter are made in the surface of the granular particle. Thus, the usual granulated powder is defined as "granular" due to the presence of relatively large pores within the granular particles. The cumulative pore volume for pore radii equal to or less than 3 µm in such a granulated powder can exceed 0.1 $cm^3$/g.

In contrast to this, when the granulated powder is subjected to a thorough sintering and melting and unification, the microfine particles undergo mass transport in order to lower the surface energy and the area of the bonding region (interface) gradually increases and the microfine particle is rounded to a more stable spherical shape. At the same time as this, the pores present in the interior of the granulated powder are eliminated and compaction is produced. Thus, for the herein disclosed thermal spray material, as compared to the granulated powder, the pore volume can be reduced and pores can be extinguished. A spherical body having a smooth surface state is assumed. The sintering of a non-oxide material generally produces oxidation of the material. With the herein disclosed thermal spray material, this oxidation is suppressed because the sintering-mediated unification is performed in an inert atmosphere. By doing this, the formation of a mixed crystal not seen in conventional granulated powders is advantageously realized.

The Thermal Sprayed Coating

A thermal sprayed coating can be formed by thermal spraying the thermal spray material described in the preceding. This thermal sprayed coating is provided, for example, as a thermal spray coated article through its disposition on the surface of a substrate. This thermal spray coated article and thermal sprayed coating are described in the following.

The Substrate

There are no particular limitations on the substrate on which the thermal sprayed coating is formed in the herein disclosed thermal spray coated article. For example, this can be a substrate composed of a material having a desirable durability when submitted to thermal spraying with the thermal spray material, but the material thereof and its shape are not particularly limited. The material constituting such a substrate can be exemplified by metal materials including various metals and semimetals and their alloys and by various inorganic materials. The metal materials can be specifically exemplified by metal materials such as aluminum, aluminum alloys, iron, steel, copper, copper alloys, nickel, nickel alloys, gold, silver, bismuth, manganese, zinc, and zinc alloys, and by semimetal materials, e.g., group IV semiconductors such as silicon (Si) and germanium (Ge); group II-VI compound semiconductors such as zinc selenide (ZnSe), cadmium sulfide (CdS), and zinc oxide (ZnO); group III-V compound semiconductors such as gallium-arsenic (GaAs), indium phosphide (InP), and gallium nitride (GaN); group IV compound semiconductors such as silicon carbide (SiC) and silicon-germanium (SiGe); and chalcopyrite semiconductors such as copper—indium—selenium ($CuInSe_2$). The inorganic material can be exemplified by substrate materials such as calcium fluoride (CaF) and quartz ($SiO_2$); ceramic oxides such as alumina ($Al_2O_3$) and zirconia ($ZrO_2$); ceramic nitrides such as silicon nitride ($Si_3N_4$), boron nitride (BN), and titanium nitride (TiN); and ceramic carbides such as silicon carbide (SiC) and tungsten carbide (WC). Any one of these materials may constitute the substrate or two or more may constitute the substrate as a composite. The following are advantageous examples among the preceding: substrates composed of, for example, steel, as typified by the various SUS materials (so-called stainless steels), which have relatively large thermal expansion coefficients among the metal materials in general use; a heat-resistant alloy as typified by Inconel; a low-expansion alloy as typified by Invar and Kovar; a corrosion-resistant alloy as typified by Hastelloy; or an aluminum alloy as typified by 1000 series to 7000 series aluminum alloys, which are useful as lightweight structural materials. This material may be, for example, a member constituting equipment for semiconductor device fabrication, wherein this member is exposed to highly reactive oxygen gas plasmas or halogen gas plasmas. Some of the preceding, for example, silicon carbide (SiC), can as a matter of convenience be classified into different categories as a compound semiconductor, an inorganic material, and so forth, but are one and the same material.

The Method for Forming the Thermal Sprayed Coating

The thermal sprayed coating can be formed by supplying the herein disclosed thermal spray material to a thermal spray apparatus based on a known thermal spray method. The thermal spray method is not particularly limited because this thermal spray material is provided with a constitution that is resistant to the oxidation induced by thermal spraying. Due to this, combinations of this thermal spray material and the various known thermal spray methods, as shown, for example, in FIG. 3, can be adopted without particular limitation. For example, thermal spray methods such as flame thermal spray methods, high-velocity flame thermal spray methods, arc thermal spray methods, plasma thermal spray methods, high-velocity plasma thermal spray methods, and cold spray methods can be advantageously adopted, as can detonation thermal spray methods and aerosol deposition methods.

Plasma thermal spray methods are a preferred example; these are thermal spray methods that utilize a plasma flame as the thermal spray heat source in order to soften or melt the thermal spray material. When an arc is generated between electrodes and a working gas is converted to a plasma by this arc, this plasma flow is converted into a high-temperature, high-velocity plasma jet through a nozzle and is ejected. Plasma thermal spray methods generally encompass coating methods in which the thermal spray material is introduced into this plasma jet and is therein heated and accelerated and deposited on a substrate to obtain a thermal sprayed coating. Plasma thermal spray methods can take the form of, for example, atmospheric plasma spraying (APS), which is carried out in the atmosphere; low-pressure plasma spraying (LPS), in which thermal spraying is carried out at an air pressure lower than atmospheric pressure; and high-pressure plasma spraying, in which plasma thermal spraying is carried out in a pressurized vessel at above atmospheric pressure. The following can be used as the working gas used in plasma thermal spraying: a rare gas as typified by argon (Ar); a reducing gas as typified by hydrogen ($H_2$); a non-oxidizing gas as typified by nitrogen ($N_2$); and mixtures of the preceding. When this plasma thermal spraying is used, as an example, the thermal spray material can be impacted and deposited on the substrate at a velocity of about 300 m/s to 600 m/s by melting and accelerating the thermal spray material using a plasma jet at about 5,000° C. to 10,000° C.

For example, a high velocity oxygen-fuel (HVOF) flame thermal spray method, a warm spray method, and a high velocity air-fuel (HVAF) flame thermal spray method can be considered for high velocity flame thermal spray methods. The HVOF thermal spray method is a type of flame thermal spray method that uses, as the thermal spray heat source, a combustion flame generated by mixing a fuel and oxygen and combusting this at high pressure. By raising the pressure in the combustion chamber, a high-velocity (this can be supersonic), high-temperature gas current, while being a continuous combustion flame, is ejected from the nozzle. HVOF thermal spray methods generally encompass coating methods in which the thermal sprayed coating is obtained by introducing the thermal spray material into this gas current and thereby heating, accelerating, and depositing the thermal spray material on the substrate. In the execution of HVOF thermal spray methods, for example, the thermal spray material is supplied to a supersonic combustion flame jet at 2,000° C. to 3,000° C., causing the thermal spray material to be softened or melted and impacted and deposited on a substrate at high velocities of 500 m/s to 1,000 m/s. The fuel used in high velocity flame thermal spraying may be a hydrocarbon gas fuel such as acetylene, ethylene, propane, or propylene or may be a liquid fuel such as kerosene or ethanol. A higher temperature for the supersonic combustion flame is preferably used as the melting point of the thermal spray material increases, and from this perspective the use of a gas fuel is preferred.

A thermal spray method referred to as warm spraying, which is an application of the HVOF thermal spray method described above, can also be used. The warm spray method is typically a method in which the thermal sprayed coating is formed by carrying out thermal spraying in a state in which the temperature of the combustion flame is lowered by, for example, mixing a cooling gas, e.g., of nitrogen, having a temperature around room temperature into the combustion flame of the HVOF thermal spray method. Thermal spray materials are not limited to a state in which complete melting has occurred, and, for example, a thermal spray material can be thermal sprayed in a state in which a portion has melted or in a state in which softening has occurred below the melting point. When warm spraying is carried out, for example, by supplying the thermal spray material to a jet of a supersonic combustion flame at 1,000° C. to 2,000° C., the thermal spray material is softened or melted and is impacted and deposited on a substrate at a high velocity of 500 m/s to 1,000 m/s.

The HVAF thermal spray method is a thermal spray method that uses air as the combustion-supporting gas in place of the oxygen used in the HVOF thermal spray method. The thermal spray temperature in the HVAF thermal spray method can be lowered from that in the HVOF thermal spray method. As an example, the thermal spray material is supplied to a jet of a supersonic combustion flame at 1,600° C. to 2,000° C. and the thermal spray material is thereby softened or melted and the thermal spray particles are then impacted and deposited on a substrate at a high velocity of 500 m/s to 1,000 m/s.

In each of the thermal spray methods described above, the thermal spray material may be supplied in the form of a powder or may be supplied in the form of a slurry. The slurry can be prepared by dispersing the powder-form thermal spray material in a dispersion medium. The dispersion medium may be an aqueous dispersion medium or a nonaqueous dispersion medium. The aqueous dispersion medium can be exemplified by water and mixtures of water with a water-soluble organic solvent (mixed aqueous solutions). The organic solvent used can be the various organic solvents capable of homogeneously mixing with water and can be exemplified by lower alcohols and lower ketones having one to four carbons and more specifically by one or two or more of methanol, ethanol, n-propyl alcohol, isopropyl alcohol, and so forth. The nonaqueous solvent is typically an organic solvent that does not contain water. This organic solvent is not particularly limited, and, for example, one of the following by itself or a combination of two or more of the following can be used: alcohols such as methanol, ethanol, n-propyl alcohol, and isopropyl alcohol, and organic solvents such as toluene, hexane, and kerosene. The content of the thermal spray material in the slurry, i.e., the solids fraction concentration, is preferably at least 10 mass %, more preferably at least 20 mass %, and even more preferably at least 30 mass %. This facilitates increasing the thickness of the thermal sprayed coating produced from the thermal spray slurry per unit time, i.e., the thermal spray efficiency. The content of the thermal spray material in the slurry is preferably not more than 70 mass %, more preferably not more than 60 mass %, and even more preferably not more than 50 mass %. This facilitates obtaining a thermal spray slurry having the required flowability adapted to provide an excellent feed to the thermal spray apparatus, i.e., obtaining a thermal spray slurry having the required flowability sufficient for forming a thermal sprayed coating. This slurry may contain various additives, e.g., a dispersing agent, and surfactant, for the purpose of, for example, maintaining a suitable dispersity by the thermal spray material.

Figure 3:
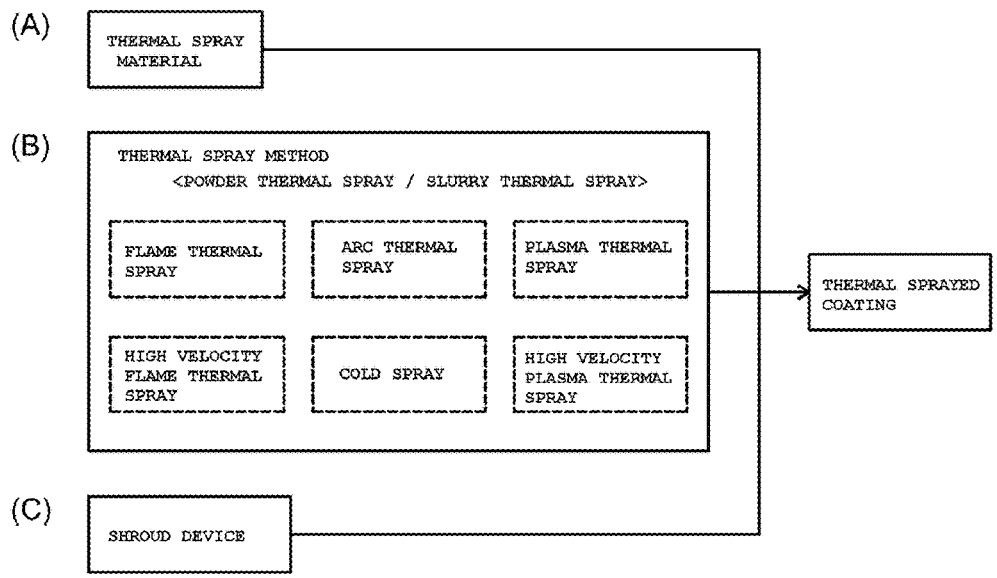
FIG. 3 is a diagram that describes the method of producing a thermal sprayed coating according to an embodiment.

While not essential, a shroud device may also be used, as shown in FIG. 3, in the thermal spray methods described above. A shroud device is a cylindrical device for more thoroughly inhibiting oxidation, during thermal spraying, of the thermal spray material and the thermal sprayed coating that is formed. The thermal spray material and thermal spray jet can be impacted on the substrate surface while shielded from the atmosphere by using this shroud device to provide a flow of shroud gas on the circumference of the thermal spray jet. The shroud device can be positioned, for example, on the barrel of the thermal spray gun of the thermal spray apparatus. For example, an inert gas, as typified by argon (Ar), nitrogen ($N_2$), and so forth, can be used as the shroud gas. By doing this, for example, overheating and oxidation of the thermal spray material can be suppressed and a compact thermal sprayed coating having a low oxygen content can be obtained.

The Thermal Sprayed Coating

The herein disclosed thermal sprayed coating is formed by spraying the thermal spray material described above on the surface of, for example, a freely selected substrate. In a preferred embodiment, the thermal sprayed coating is formed directly on the substrate surface without an intervening stress-relaxation layer and so forth. Accordingly, this thermal sprayed layer contains, for example, a rare earth element (RE), oxygen (O), and a halogen element (X) as constituent elements. In addition, the herein disclosed thermal spray material can contain a mixed crystal, as described above, of an oxyhalide of a rare earth element and a halide of a rare earth element. In a preferred embodiment of this thermal spray material, it is a powder composed of particles having smooth surfaces, and even when supplied to thermal spraying such a thermal spray material resists oxidation and suppresses the halogen element volatilization associated with oxidative decomposition. As a result, the thermal sprayed coating obtained by the thermal spraying of this thermal spray material can be a thermal sprayed coating provided with a compact structure. For example, the porosity exceeds 5.5% (for example, at least 5.8%) for thermal sprayed coatings obtained using a conventional thermal spray material comprising a rare earth element oxyhalide and lacking mixed crystals, but in contrast to this the herein disclosed thermal sprayed coating has a porosity that is reduced, for example, to 5.5% or less. The porosity of the thermal sprayed coating can be, for example, not more than 5%, preferably not more than 4.5%, more preferably not more than 4%, and particularly preferably not more than 3.5% and may be, for example, not more than 3%. By doing this, a thermal sprayed coating is realized for which the generation of microfine particles is suppressed even when exposed to a halogen plasma.

The herein disclosed thermal sprayed coating can be formed from the thermal spray material as described above in a state in which halogen element volatilization is suppressed and the compositional ratios for the rare earth element, oxygen, and halogen element are largely maintained. Accordingly, its halogen element content is increased over that of thermal sprayed coatings obtained from conventional thermal spray materials comprising a rare earth element oxyhalide. The proportion of the halogen element in the total of the rare earth element, oxygen, and halogen element in the thermal sprayed coating is preferably at least 30 atom % and is more preferably at least 35 atom %. However, it is undesirable when the thermal sprayed coating has an excessive halogen element content because the composition of the thermal sprayed coating then becomes closer to rare earth element halide than rare earth element oxyhalide and the dusting resistance cannot be reduced. Accordingly, the proportion of the halogen element in the total of the rare earth element, oxygen, and halogen element in the thermal sprayed coating is preferably not more than 55 atom % and more preferably not more than 50 atom %, for example, not more than 45 atom %.

Oxidation of the thermal spray material by thermal spraying is thoroughly suppressed with the thermal sprayed coating obtained as described above. Due to this, the rare earth element (RE), oxygen (O), and halogen element (X) can be present as a rare earth element oxyhalide. For example, the thermal sprayed coating constitutes a coating for which the main component is rare earth element oxyhalide (RE-O-X).

Here, "main component" means the component with the highest content of the constituent components constituting the thermal sprayed coating. Specifically, for example, it means that this component accounts for at least 50 mass % of the overall thermal sprayed coating and preferably accounts for at least 75 mass %, for example, at least 80 mass %. A detailed description of this rare earth element oxyhalide is omitted since it is the same as for the previously described thermal spray material.

While the detailed mechanism is unclear, rare earth element oxyhalides have an excellent dusting resistance and plasma erosion resistance and in particular have an excellent dusting resistance versus halogen plasmas. Accordingly, a thermal sprayed coating for which the main component is rare earth element oxyhalide can have an outstanding dusting resistance.

The herein disclosed thermal sprayed coating can, in a more preferred embodiment, contain a mixed crystal of a rare earth element oxyhalide and a rare earth element halide. That is, the mixed crystal in the thermal spray material remains present as the mixed crystal, although the solid solution ratio for the rare earth element halide may be reduced. The composition of the mixed crystal and its proportion in the coating are not particularly limited. For example, the proportion of the mixed crystal in the thermal sprayed coating can be, for example, at least 5 mass % and may be at least 10 mass % and is preferably at least 15 mass % and, for example, can be at least 20 mass %. By doing this, a thermal sprayed coating is provided that is even more compact and has an excellent plasma erosion resistance and an excellent dusting resistance.

In addition, the herein disclosed thermal sprayed coating can be realized as a thermal sprayed coating that substantially does not contain rare earth element halide. When a halide of a rare earth element is present in a thermal sprayed coating and such a thermal sprayed coating is exposed to, for example, an oxygen plasma, regions where the rare earth element halide is present readily undergo oxidation. When a rare earth element oxide is produced by the oxidation of rare earth element halide, this rare earth element oxide can form a regional modification layer. The modification layer region (rare earth element oxide), while being relatively hard, is also brittle, and as a consequence exposure to a plasma environment, for example, in dry etching, can result in the exfoliation of this modification layer region and the production of microfine particles.

In contrast to this, the herein disclosed thermal sprayed coating substantially does not contain a rare earth element halide. Accordingly, the production of microfine particles when exposed to a plasma is suppressed and a thermal sprayed coating having an outstanding plasma erosion resistance and dusting resistance can be obtained.

Figure 4A:
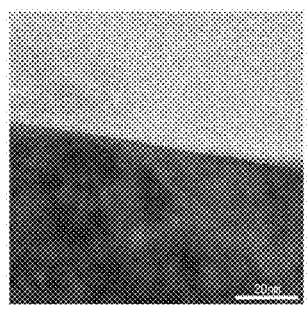
FIG. 4A is a diagram that relates to a thermal sprayed coating prior to modification, wherein (1) is an example of a transmission electron microscope (TEM) image of the cross section and (2) schematically describes the crystal structure of the thermal sprayed coating.
Figure 4A:
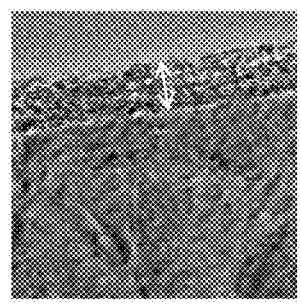
Figure 4B:
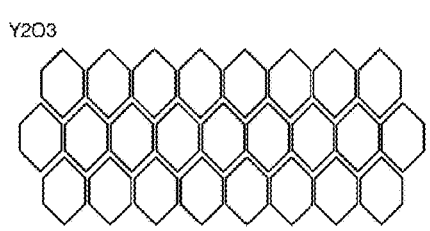
FIG. 4B is a diagram that relates to a thermal sprayed coating after modification, wherein (1) is an example of a transmission electron microscope (TEM) image of the cross section and (2) schematically describes the crystal structure of the thermal sprayed coating.
Figure 4B:
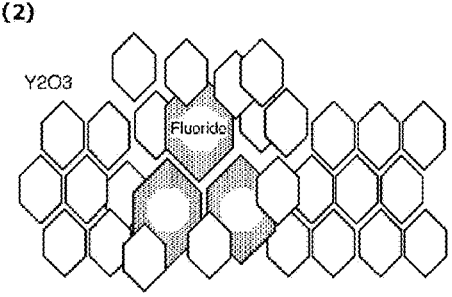

The modification layer formed when the thermal sprayed coating is exposed to a halogen plasma will now be described. For example, (1) in FIG. 4A is a TEM image of the cross section of a thermal sprayed coating (for example, a $Y_2O_3$ thermal sprayed coating) prior to its exposure to a fluorine plasma, while (1) in FIG. 4B is a TEM image of the cross section of the thermal sprayed coating after exposure to a fluorine plasma. As is clear from these figures, a distinct change in the crystalline structure near the surface (region of about 50 nm from the surface) is recognized for the thermal sprayed coating after its exposure to a fluorine plasma. The formation of this modification layer is seen to a significant degree when the composition of the thermal sprayed coating is rare earth element oxide. This phenomenon is thought to occur for the following reason. Thus, for example, as shown in (2) of FIG. 4A, $Y_2O_3$ has a relatively compact crystalline structure with a volume per 1 mol of 22.7 $cm^3$/mol. The fluoride ($YF_3$), which has a relatively large crystalline structure as shown in (2) in FIG. 4B, is formed by exposing this $Y_2O_3$ to a highly reactive fluorine plasma. The volume per 1 mol of this $YF_3$ is 37.0 $cm^3$/mol, which is about 1.62-times that of $Y_2O_3$. It is therefore thought that, as a result of the volumetric expansion due to exposure to a halogen plasma, the coating structure of the thermal sprayed coating is fractured at the crystal level and becomes porous and microfine particles are then readily produced upon subsequent further exposure to a plasma.

In a more preferred embodiment, this thermal sprayed coating is also provided as a thermal sprayed coating that substantially does not contain an oxide of the aforementioned rare earth element. Rare earth oxides, as noted above, are relatively hard but brittle, and due to this microfine particles can be produced upon subsequent exposure to a plasma environment in, for example, dry etching. Accordingly, the herein disclosed thermal sprayed coating can take on an outstanding dusting resistance when it also substantially does not contain this rare earth element oxide.

Low particle generation is required of a dry etching apparatus for semiconductor device fabrication. The causes of this particle generation are thought to be the exfoliation of reaction products attached to the interior of the vacuum chamber as well as the deterioration of the chamber and its protective coating (this can be a thermal sprayed coating) due to the use of halogen gas plasmas and oxygen gas plasmas. Due to this, plasma-exposed locations in existing semiconductor device fabrication equipment are replaced after prescribed operating time intervals (plasma exposure times) as determined in correspondence to the plasma erosion resistance performance of the plasma-exposed locations.

The plasma erosion resistance performance of thermal sprayed coatings has heretofore been evaluated based on the amount of consumption (for example, amount of etching and etching rate) of a thermal sprayed coating due to exposure to a plasma. As an example, the fluorine plasma-based consumption of the thermal sprayed coatings obtained from thermal spray materials with the four compositions given below generally increases in the sequence given below and yields the evaluation that the thermal sprayed coating of alumina ($Al_2O_3$) is the most easily eroded by plasma and the $Y_2O_3$ thermal sprayed coating is the most resistant to erosion by plasma. Alumina is known to be the hardest of the oxides, and it can be concluded that thermal sprayed coatings formed from the thermal spray materials $Y_2O_3$, YOF, and $YF_3$ are all equipped with a higher plasma erosion resistance performance than alumina thermal sprayed coatings.

$$Y_2O_3 < YOF < YF_3 \ll Al_2O_3$$

On the other hand, particles can become problematic as their diameter increases; however, as the processing precision has become more demanding in recent years, rigorous control of the generation of particles having diameters of not more than 0.2 μm (generally less than 0.2 μm, for example, 0.1 μm and below) has also become necessary. A characteristic feature of particles of less than 0.2 μm is that, while they have a small volume for the individual particle itself, their number can easily grow. Due to this, the generation of particles of less than 0.2 μm, i.e., "dusting", can be regarded as distinct from the conventional relatively large particles. Investigations by the present inventors have shown that the number and size of particles generated as dust from thermal sprayed coatings is substantially influenced by the composition and structure of the thermal sprayed coating, and particularly by the composition, and not by the operating time (plasma exposure time) of the semiconductor device fabrication equipment. Thus, it is thought that when a thermal sprayed coating is exposed to a halogen gas plasma or oxygen gas plasma, the composition itself of the thermal sprayed coating changes (undergoes modification) and the structure of the coating also changes and the generation of finer particles (i.e., dusting) is then readily induced. As one example, the dust generation behavior of these thermal sprayed coatings has been recognized as generally increasing in the sequence given below as a function of the composition of the thermal sprayed coatings. Thus, the thermal sprayed coating formed from $Y_2O_3$ readily produces particles of less than 0.2 μm and is therefore regarded as having a poor dusting resistance.

$$YOF < YF_3 < Y_2O_3$$

In contrast to this, the herein disclosed thermal spray material, because it contains a mixed crystal of a rare earth element halide (for example, $YF_3$) and a rare earth element oxyhalide (for example, $Y_5O_4F_7$), is more resistant to oxidation by thermal spraying than either a thermal spray material composed of $YF_3$ or a thermal spray material composed of YOF. As a result, a thermal sprayed coating formed from the herein disclosed thermal spray material can be provided with a composition that exhibits a high dusting resistance, i.e., rare earth element halide (for example, $YF_3$) or rare earth element oxyhalide (for example, $Y_5O_4F_7$). Accordingly, the use of the herein disclosed thermal spray material makes it possible to form a thermal sprayed coating that exhibits both an outstanding plasma erosion performance and an outstanding dusting resistance. While particles of 0.2 μm and larger can be produced when conventional thermal sprayed coatings are used, by carrying out thermal spraying using the herein disclosed thermal spray material, for example, the formation of the modification layer, which causes the production of coarse particles of approximately 0.2 μm and larger, is suppressed in contemporary dry etching environments. When the herein disclosed thermal sprayed coating is eroded in a dry etching environment, the particles that are produced are mainly constituted of the particulate modification layer with a size of approximately less than 0.2 μm (typically not more than 0.1 μm), and their number is also suppressed. Accordingly, the herein disclosed thermal sprayed coating suppresses the production of particles, for example, of approximately less than 0.2 μm (for example, 0.1 μm and smaller, typically 0.06 μm and smaller, preferably 19 nm and smaller, more preferably 5 nm and smaller, and most preferably 1 nm and smaller). For example, the number of these particles produced is held to substantially zero.

The dusting resistance of thermal sprayed coatings can be evaluated, for example, using the number of particles produced when the thermal sprayed coating is exposed to a prescribed plasma environment. In the usual dry etching, an etching gas is introduced into a vacuum compartment (chamber), and a plasma is generated by the excitation of this etching gas using, for example, high frequency or microwaves, and radicals and ions are produced. The radicals and ions produced by this plasma react with the etching target (typically a silicon wafer) and, with the reaction products being volatile gases, the etching target can be micromachined by their exhaust to the outside by the vacuum exhaust system. For example, in an actual parallel-plate reactive ion etching (RIE) device, a pair of parallel-plate electrodes is disposed in an etching compartment (chamber). High frequency is applied to one electrode to generate a plasma and etching is carried out on a wafer placed on this electrode. The plasma is produced in a pressure region of about at least 10 mTorr and not more than 200 mTorr. As indicated above, various halogen gases, oxygen gas, and inert gases can be considered for the etching gas. For the evaluation of the plasma erosion resistance of a thermal sprayed coating, a mixed gas containing halogen gas and oxygen gas (for example, a mixed gas containing argon and carbon tetrafluoride and oxygen in a prescribed volumetric ratio) is advantageously used as the etching gas. The flow rate of the etching gas is, for example, preferably about at least 0.1 L/minute and not more than 2 L/minute.

The plasma erosion resistance of a thermal sprayed coating can be suitably evaluated by measuring the number of particles produced after leaving the thermal sprayed coating in a plasma environment for a prescribed period of time (for example, the time required to process 2,000 semiconductor substrates (silicon wafer and so forth)). In order to realize a high degree of quality control, for example, particles having a diameter of at least 0.06 μm can be made the measurement target here; however, this can also be changed as appropriate in correspondence to the required quality. For example, the plasma erosion resistance can be evaluated by calculating how many particles of this size are deposited per unit area of the semiconductor substrate and determining the number of particles produced (number/cm$^2$).

In a preferred embodiment of the herein disclosed thermal sprayed coating, the number of such particles produced is kept to about 15/cm$^2$ or fewer. For example, the number of particles produced by the conditions specified below can be brought to 15/cm$^2$ or fewer. Such a construction is preferred because it realizes a thermal sprayed coating that has a reliably enhanced plasma erosion resistance.

Conditions for Counting the Number of Particles Produced

A 70 mm×50 mm thermal sprayed coating is placed on the upper electrode in a parallel-plate plasma etching device. A substrate with a diameter of 300 mm that is the target for the plasma treatment is placed on the stage. First, in order to model the state of the thermal sprayed coating after long-term use, a dummy run that performs a plasma dry etching treatment on 2,000 substrates (silicon wafer) is carried out for a total of 100 hours. The plasma generation conditions are pressure: 13.3 Pa (100 mTorr); etching gas: mixed gas of argon, carbon tetrafluoride, and oxygen; applied voltage:

13.56 MHz, 4,000 W. A measurement monitoring substrate (silicon wafer) is then placed on the stage and a plasma is generated for 30 seconds under the same conditions as above. The number of particles with a diameter of at least 0.06 μm deposited on the measurement monitoring substrate is counted both before and after the plasma treatment. Here, the value yielded by dividing the number of particles counted by the area of the substrate is taken to be the number of particles produced (number/cm$^2$), and this may be used for evaluation. The etching gas here is a mixed gas containing argon, carbon tetrafluoride, and oxygen. The flow rate of the etching gas is, for example, 1 L/minute.

Several examples related to the present invention are described in the following, but this should not be taken to mean that the present invention is limited to or by that which is shown in these examples.

Embodiment 1
Thermal Spray Material
Reference Example

The thermal spray material of the Reference Example was obtained according to the disclosure in Example 10 in paragraphs 0045 to 0051 in WO 2014/002580. Specifically, yttrium fluoride synthesized by a wet method was first fired for 12 hours at 1,125° C. in the atmosphere followed by granulation and drying using a spray dryer to obtain a granulate. The obtained granulate was then introduced into an alumina vessel and was fired for 12 hours at 600° C. in the atmosphere in an electric furnace to obtain the thermal spray material of the Reference Example in the form of granulated granules.

EXAMPLES 1 and 2

For the thermal spray materials, granular powders were prepared of yttrium oxide ($Y_2O_3$) and of yttrium fluoride ($YF_3$), which are commonly used as protective coatings for members in semiconductor device fabrication equipment, and these were used, respectively, as the thermal spray materials in Examples 1 and 2. These materials were prepared as follows: a powder of $Y_2O_3$ or $YF_3$ having an average particle diameter of approximately 3 μm was used as the starting material; this was dispersed in a dispersion medium along with a resin binder at a solids concentration of 50 mass %; granulation was subsequently carried out using a rotating disk-type spray-dry granulator; and sintering was performed at 1,000° C. in a nonoxidizing atmosphere.

EXAMPLES 3 and 4

A yttrium oxyfluoride granular powder having the composition YOF (which was $Y_2O_2F_2$) and a yttrium oxyfluoride granular powder having the composition $Y_5O_4F_7$ were prepared and used as the thermal spray materials in Examples 3 and 4, respectively. These thermal spray materials were prepared as follows: powders of $Y_2O_3$ and $YF_3$ having an average particle diameter of approximately 3 μm were used as the starting materials; these were blended to provide a $YF_3$ proportion of approximately 40 mol % or approximately 50 mol %, respectively; and granulation and sintering were carried out under the same conditions as in Examples 1 and 2.

EXAMPLE 5

A powder (not granular) of a yttrium oxyfluoride having the composition $Y_5O_4F_7$ was prepared and was used as the thermal spray material of Example 5. This thermal spray material was produced using the following procedure. Thus, using powders of $Y_2O_3$ and $YF_3$ having an average particle diameter of approximately 3 μm as the starting materials, these were first blended to provide a $YF_3$ proportion of approximately 50 mol % and a slurry was prepared by dispersion in a dispersion medium along with a resin binder. Preparation was then carried out by granulating this slurry by a spray drying procedure using an ultrasound sprayer followed by thoroughly melting or sintering at 1,000° C. in a nonoxidizing atmosphere.

EXAMPLES 6 to 8

Powders (not granular) composed of mixed crystals of $Y_5O_4F_7$ and $YF_3$ having compositions with different solid solution ratios were then prepared and were used, respectively, as the thermal spray materials of Examples 6 to 8. For these thermal spray materials, powders of $Y_2O_3$ and $YF_3$ having an average particle diameter of approximately 3 μm were used as the starting materials, and these were blended so as to bring the $YF_3$ to the prescribed proportion of at least about 60 mol % followed by dispersion in a dispersion medium along with a resin binder to prepare a slurry. Preparation was subsequently carried out by executing granulation and melting or sintering under the same conditions as in Example 5.

EXAMPLES 6* to 8*

For reference, thermal spray materials in the form of granulated powders were prepared by stopping the firing of the granulated powders in Examples 6 to 8 at the level at which sintering of the granular particles occurs at 1,000° C. in a nonoxidizing atmosphere.

The properties of these thermal spray materials were determined and are reported in the following Table 2.

TABLE 2

| | Example | | Reference | 1 | 2 | 3 | 4 | 6 * | 7 * | 8 * | 5 | 6 | 7 | 8 |
|---|---|---|---|---|---|---|---|---|---|---|---|---|---|---|
| thermal spray material | particle size [μm] | | −75 + 10 μm | −75 + 10 μm | −90 + 5 μm | −45 + 10 μm | −45 + 10 μm | −45 + 10 μm | −45 + 10 μm | −45 + 10 μm | −45 + 10 μm | −45 + 10 μm | −45 + 10 μm | −45 + 10 μm |
| | composition | | YF3/YOF | Y2O3 | YF3 | YOF | Y5O4F7/YF3 | Y5O4F7/YF3 | Y5O4F7/YF3 | Y5O4F7/YF3 | Y5O4F7/YF3 | Y5O4F7/YF3 | Y5O4F7/YF3 | Y5O4F7/YF3 |
| | element ratio [atm %] | Y | 25 | 40 | 25 | 33 | 31 | 30 | 29 | 27 | 31 | 30 | 29 | 27 |
| | | O | 2 | 60 | 0 | 33 | 25 | 20 | 14 | 7 | 25 | 20 | 14 | 7 |
| | | F | 73 | 0 | 75 | 33 | 44 | 50 | 57 | 67 | 44 | 50 | 57 | 67 |
| | molar ratio/ solid solution ratio [mol %] | Y5O4F7 | 0 | 0 | 0 | 0 | 100 | 80 | 56 | 28 | 100 | 80 | 56 | 28 |
| | | YOF | 5 | 0 | 0 | 100 | 0 | 0 | 0 | 0 | 0 | 0 | 0 | 0 |
| | | YF3 | 95 | 0 | 100 | 0 | 0 | 20 | 44 | 72 | 0 | 20 | 44 | 72 |
| | | Y2O3 | 0 | 100 | 0 | 0 | 0 | 0 | 0 | 0 | 0 | 0 | 0 | 0 |
| | particle size distribution [μm] | <20(%) | 3 | 10 | 5 | 16 | 3 | 13 | 15 | 12 | 10 | 16 | 23 | 21 |
| | | D10 | 26 | 14 | 23 | 18 | 25 | 19 | 20 | 19 | 20 | 18 | 15 | 16 |
| | | D50 | 45 | 30 | 40 | 27 | 37 | 29 | 30 | 30 | 31 | 30 | 28 | 27 |
| | | D90 | 81 | 55 | 70 | 43 | 57 | 46 | 52 | 47 | 50 | 51 | 51 | 45 |
| | cumulative pore volume (r ≤ μm, cm³/g) | | 0.35 | 0.23 | 0.16 | 0.03 | 0.14 | 0.19 | 0.04 | 0.14 | <0.01 | <0.01 | <0.01 | <0.01 |
| | powder type | | granular | | granular | | | granular | | | | | | |
| thermal spray method | thermal spray device | | | | | | | SG-100 | | | | | | |
| | thermal spray gas | | | | | | | Ar/He | | | | | | |
| | shroud | | | | | | | none | | | | | melted | |
| thermal sprayed coating | porosity [%] | | 13 | 4 | 3 | 9 | 10 | 6 | 5 | 4 | 8 | 4 | 3 | 3 |
| | presence/absence of unmelted particles | | present | present | present | present | present | present | present | present | absent | absent | absent | absent |
| | element ratio [%] | Y | 32 | 40 | 30 | 40 | 35 | 34 | 29 | 27 | 33 | 33 | 33 | 33 |
| | | O | 13 | 60 | 10 | 40 | 36 | 35 | 30 | 18 | 28 | 29 | 25 | 14 |
| | | F | 55 | 0 | 60 | 20 | 29 | 31 | 41 | 55 | 38 | 38 | 42 | 54 |
| | XRD intensity ratio [%] | Y5O4F7 | 0 | 0 | 0 | 0 | 21 | 41 | 66 | 26 | 73 | 55 | 78 | 58 |
| | | YOF | 0 | 0 | 0 | 45 | 64 | 59 | 26 | 47 | 10 | 45 | 14 | 33 |
| | | YF3 | 15 | 0 | 70 | 55 | 15 | 0 | 0 | 0 | 0 | 0 | 0 | 0 |
| | | Y2O3 | 32 | 100 | 0 | 0 | 0 | 0 | 0 | 0 | 0 | 0 | 0 | 0 |
| | | YOF system | 53 | 0 | 30 | 0 | 0 | 0 | 8 | 27 | 0 | 0 | 8 | 9 |
| | Y 3d orbital binding energy | 1st peak | 160 | 156 | 160 | 159 | 159 | 159 | 159 | 159 | 158 | 159 | 159 | 159 |
| | | 2nd peak | 158 | 1101Ie | 159.3 | 1101Ie | 1101Ie | 1101Ie | 1101Ie | 1101Ie | 158.7 | 1101Ie | 1101Ie | 1101Ie |
| | plasma resistance (μm/hr) | | 2.5 | 1.7 | 2.6 | 2.2 | 2.3 | 2.2 | 2.3 | 2.4 | 2.4 | 1.8 | 2.0 | 2.1 |
| | dust generation behavior | | C | D | C | C | C | B | B | B | C | A | A | B |
| | modification layer (nm) | | 10 | 50 | 10 | 10 | 5 | 5 | 6 | 8 | 5 | not detected | not detected | not detected |

The "composition" row for "thermal spray materials" in Table 2 gives the detected crystal phase or the estimated gross composition resulting from performing powder x-ray diffraction analysis on the individual thermal spray materials. In this row, "$Y_2O_3$" indicates that a phase composed of yttrium oxide was detected; "YF3" indicates that a phase composed of yttrium fluoride was detected; and "Y5O4F7" indicates that a phase composed of yttrium oxyfluoride with the chemical composition given by $Y_5O_4F_7$ was detected. In addition, "Y5O4F7/YF3" indicates that a mixed crystal of yttrium oxyfluoride and yttrium fluoride was obtained. For reference, the results of the XRD analysis on the thermal spray material of Example 8 is adopted for the XRD pattern of the powder (c) in FIG. 1.

These analyses used an x-ray diffraction analyzer (Ultima IV, Rigaku Corporation) and used the CuKα line (20 kV voltage, 10 mA current) as the x-ray source, and the measurements were performed using 2θ=10° to 70° for the scanning range, 10°/min for the scan speed, and 0.01° for the sampling width. The divergence slit was adjusted to 1°, the divergence vertical limit slit was adjusted to 10 mm, the scattering slit was adjusted to ⅙°, the receiving slit was adjusted to 0.15 mm, and the offset angle was adjusted to 0°.

The "element ratio" row gives the results of measurement, using an EDX analyzer (EX-250SE, Horiba, Ltd.), of the concentration (atom %) of the yttrium (Y), oxygen (O), and fluorine (F) in each thermal spray material.

The "molar ratio/solid solution ratio" row gives the proportion for the $Y_5O_4F_7$ phase, YOF phase, $YF_3$ phase, and $Y_2O_3$ phase present in each of the thermal spray materials, where the overall total is 100 mol %. The proportion for each phase was calculated from the ratio of the peak height of the maximum peak for each crystal phase in the x-ray diffraction pattern. For the thermal spray materials in Examples 6 to 8, the solid solution ratio for the $Y_5O_4F_7$ phase and $YF_3$ phase in the mixed crystal was calculated using 100 mol % for the total of the two.

The "particle size distribution" row gives the results of measurement of the volume-based particle size distribution of the thermal spray materials, wherein the measurement was performed using a laser diffraction/scattering particle size distribution analyzer (LA-300, Horiba, Ltd.). The volume % of particles with a particle diameter of equal to or less than 20 μm is given in the "<20" row, and the cumulative 10% particle diameter, cumulative 50% particle diameter (average particle diameter), and cumulative 90% particle diameter based on the obtained particle size distribution are given in the "D10", "D50", and "D90" rows, respectively.

The pore distribution feature was measured on each thermal spray material using a mercury intrusion porosimeter (Poresizer 9320, Shimadzu Corporation), and the cumulative pore volume for pores with a pore radius of equal to or less than 1 μm was calculated from these results and is given in the "cumulative pore volume" row.

In the "powder type" row, "granular" is given when the particular thermal spray material was a granule, and "melted" is given when granulation was followed by sintering, melting, and unification.

Formation of the Thermal Sprayed Coatings

Thermal spray coated article provided with thermal sprayed coatings No. 1 to 9-2 were produced by thermal spraying using thermal sprayed coatings No. 1 to 8 and 6* to 8* and using the plasma thermal spray device indicated in Table 2. The thermal spraying conditions were as indicated in the following.

Thus, a sheet (70 mm×50 mm×2.3 mm) of aluminum alloy (Al6061) was prepared and was subjected to a blast treatment with brown alumina abrasive (A #40) and was then used as the substrate, i.e., material to be thermal sprayed. Plasma thermal spraying was carried out using an "SG-100" commercial plasma thermal sprayer (Praxair Surface Technologies). With regard to the plasma generation conditions for thermal spraying using the SG-100, the plasma was generated under conditions of a voltage of 37.0 V and a current of 900 A using 50 psi (0.34 MPa) argon gas and 50 psi (0.34 MPa) helium gas as the thermal spray gas (plasma working gas). A powder feeder (Model 1264, Praxair Surface Technology, Inc.) was used to feed the thermal spray material to the thermal spray device; the thermal spray material was fed to the thermal spray device at a rate of 20 g/min; and a thermal sprayed coating having a thickness of 200 μm was formed. The travel speed of the thermal spray gun was 24 m/min and the thermal spray gap was 90 mm.

Thermal Sprayed Coatings

The characteristics of the thusly obtained thermal sprayed coatings were investigated and are given in Table 2.

The results of measurement of the porosity of the thermal sprayed coatings are given in the "porosity" row in Table 2. The porosity was measured as follows. Thus, the thermal sprayed coating was sectioned in the plane orthogonal to the surface of the substrate and the resulting cross section was embedded in resin and polished and an image of the cross section was then made using a digital microscope (VC-7700, OMRON Corporation). The porosity was determined by processing this image using image processing software (Image Pro, Nippon Roper K. K.) and identifying the area of the pore regions in the cross-sectional image and calculating the percentage taken up by this pore region area in the overall cross section. For reference, the results of SEM observation of thermal sprayed coatings obtained by the thermal spraying of the thermal spray materials in Examples 5 and 8 are given in FIGS. 5A to 6B, respectively.

Figure 7:
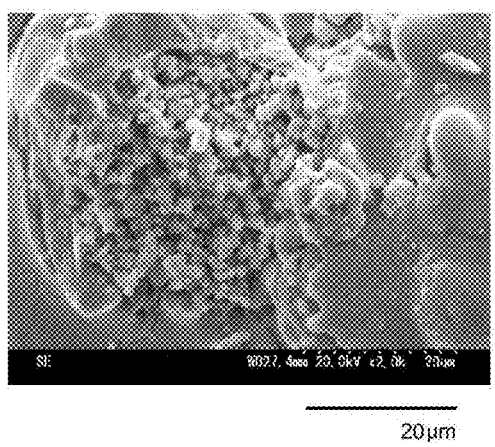
FIG. 7 is a diagram that gives an example of the results of SEM observation of the thermal sprayed coating obtained by the thermal spraying of the thermal spray material of the Reference Example.

The thermal sprayed coatings were observed with a scanning electron microscope (SEM), and the results of observation of whether the thermal spray material in the thermal sprayed coating remained in an unmelted state are given in the "presence/absence of unmelted particles" row. The "present" represents that the presence of unmelted particles in the thermal sprayed coatings was confirmed and the "absent" represents that the presence of unmelted particles in the thermal sprayed coatings was not confirmed. For reference, FIG. 7 provides the results of observation of the thermal sprayed coating obtained by the thermal spraying of the thermal spray material of the Reference Example.

The "element ratio" row gives the results of measurement, using the same EDX analyzer as indicated above, of the concentration (atom %) of yttrium (Y), oxygen (O), and fluorine (F) in the thermal sprayed coatings.

The "XRD intensity ratio" row gives the relative value, using 100 for the intensity of the highest main peak, of the intensity of the main peak for each crystal phase detected in the diffraction pattern obtained as a result of powder x-ray diffraction analysis on the individual thermal sprayed coatings. For reference, the main peaks for the individual crystal phases are detected at 29.157° for $Y_2O_3$, at 27.881° for $YF_3$, at 28.064° for YOF, and at 28.114° for $Y_5O_4F_7$. The "YOF system" refers to the relative intensity for the main peak in the pattern of a compound having the same crystal structure as YOF or $Y_5O_4F_7$, but for which the specific composition is uncertain (i.e., a compound for which the element ratios of Y, O, and F could not be identified).

The "Y 3d orbital" row gives the results of measurement, using the same XPS analyzer as indicated above, of the 3d orbital binding energy for the element Y in each thermal sprayed coating.

The "plasma resistance" row gives the results of an evaluation of the plasma erosion resistance performance of the individual thermal sprayed coatings. Specifically, it gives the results of measurement of the reduction in the film thickness (amount of etching) of the thermal sprayed coating when the thermal sprayed coating was exposed for 10 hours to a halogen plasma. Thus, the surface of the thermal sprayed coating on the thermal spray coated article fabricated as described above was first mirror polished using colloidal silica having an average particle diameter of 0.06 μm. This thermal spray coated article was placed, with the polished surface exposed, on a member corresponding to the upper electrode in the chamber of a parallel plate-type semiconductor device fabrication apparatus. A silicon wafer with a diameter of 300 mm was placed on the stage in the chamber, and a 100-hour dummy run that performed plasma dry etching on 2,000 silicon wafers was carried out. The plasma in the etching treatment was generated by the application of 1,500 W of high-frequency power at 13.56 MHz while holding the pressure in the chamber at 13.3 Pa and feeding an etching gas containing prescribed proportions of argon (Ar), carbon tetrafluoride ($CF_4$), and oxygen (O) at a flow rate of 1 L/minute. A particle-count silicon wafer with a diameter of 300 mm was subsequently placed on the stage in the chamber, and the reduction in the film thickness of the thermal sprayed coating (unit: μm) when a plasma was generated for 10 hours under the same conditions as above is given.

The "dust generation behavior" row gives the results of an evaluation of the number of particles produced from the thermal sprayed coating when the thermal sprayed coating was exposed for 1 hour to a halogen plasma. The evaluation results are given for the measurement—using a Surfscan SP5, a wafer surface inspection instrument from KLA-Tencor Corporation, rather than a Surfscan SP2—of the number of particles produced when the thermal sprayed coated was subjected to plasma etching under the same conditions as above. The Surfscan SP5 can detect particles with diameters equal to or greater than 19 nm, and particle count [2] gives the results when the measurement target was extended to finer particles deposited on the silicon wafer. It had been determined that the number of particles produced more or less reaches saturation after approximately 30 minutes after exposure to the plasma; however, 1 hour was used for the exposure time in this example in order to eliminate variability. To count the total number of particles, the number of particles on the silicon wafer was counted before and after a 30-second plasma etch, and the difference was taken to be the number of particles (total number) generated from the thermal sprayed coating after plasma exposure and deposited on the silicon wafer.

The following are used for the particle count [2] row:
"A*" is indicated when the particle count (relative value) is not more than 1;
"A" is indicated when the particle count is greater than 1 and not more than 5;
"B" is indicated when the particle count is greater than 5 and not more than 15;
"C" is indicated when the particle count is greater than 15 and not more than 100; and
"D" is indicated when the particle count is greater than 100.

The "modification layer" row gives the results of a determination of whether a modification layer had been formed on the surface of the thermal sprayed coating when the thermal sprayed coating was exposed to plasma as described above. The formation of the modification layer was checked by observation of the cross section of the thermal sprayed coating using a transmission electron microscope (TEM). In the TEM observation, the modification layer was taken to be the region, in the vicinity of the surface of the cross section of the thermal sprayed coating, that had a contrast clearly different from the surroundings and that had lost the compact character. When a modification layer had been formed, the average value of the thickness (size) of the modification layer measured at five points in the TEM image of the modification layer was used as the average thickness of the modification layer, and this result is given in the "modification layer" row in Table 2.

Evaluations

As is clear from the Reference Example in Table 2, it was found that the granular thermal spray material produced by firing in the atmosphere, because the firing temperature was kept low at about 600° C., which is a temperature sufficiently lower than 900° C., in order to avoid excessive oxidation, had a composition that was the $YF_3$ starting material as such with YOF being only weakly present. FIG. 7 is an observed image that shows a portion of the surface state of the thermal sprayed coating obtained by thermal spraying the thermal spray material of the Reference Example. As shown in FIG. 7, it was observed that the granular thermal spray material did not undergo thorough melting in the thermal spray flame and that a thermal sprayed coating was formed in an unmelted state. In addition, the thermal sprayed coating of the Reference Example was shown to have the highest porosity, at 13%, among all the examples. This is thought to be due to the thermal spray material being fluorine-rich granules, which resulted in the volatilization of a large amount of fluorine during thermal spraying and an inhibition of the formation of a compact thermal sprayed coating. It is also thought to be due to an inadequate transfer of heat into the interior of the granular particles during thermal spraying because the thermal spray material is a granule, resulting in the formation of a coating in which the central portion is the granule as such. Accordingly, it was found that, while the fluorine content in the thermal sprayed coating in the Reference Example was relatively high, large amounts of $Y_2O_3$ were formed accompanying oxidation of the $YF_3$ and the thermal sprayed coating contained as much as 15% $Y_2O_3$. As a result, the thermal sprayed coating in the Reference Example was found to have a low plasma erosion resistance performance originating from the high porosity and thus was easily etched upon plasma exposure. At the same time, it was also found that the thermal sprayed coating of the Reference Example, because it contained a large amount of $Y_2O_3$, formed a modification layer upon exposure to plasma and thus also had a high dust generation behavior.

On the other hand, as is clear from the results for Example 1, it was found that the thermal sprayed film formed by the thermal spraying of a thermal spray material composed of only $Y_2O_3$ (yttrium oxide) was constituted of substantially only $Y_2O_3$ and that no further oxidative decomposition and so forth of the $Y_2O_3$ during thermal spraying was seen. Thus, the thermal sprayed coating of Example 1 was found to be constituted of only a $Y_2O_3$ phase. The thermal sprayed coating of Example 1 was found to have a relatively low porosity value of 4%, but the granular thermal spray material was not completely melted by thermal spraying and a granular structure was seen in a portion of the thermal sprayed coating. Here, it is thought that, while only the granule surface melts during thermal spraying and attaches to the substrate, the interior of the granule does not melt and the fine particles constituting the granule as such remain present in the coating.

The thermal sprayed coating of Example 1 was found to have the least amount of etching during the 10-hour plasma exposure among all the examples and thus had an excellent plasma erosion resistance performance. However, the production of particles having a diameter of at least 19 nm during the 1-hour plasma exposure was the largest among all the examples. In addition, it was found that the surface of the thermal sprayed coating of Example 1 underwent a large modification during the 1-hour plasma exposure and multiple approximately 50-nm modification layers were formed. The size of this modification layer was substantially larger than in all the other examples and a correlation with the amount of particle production is seen. Based on this, it was confirmed that the thermal sprayed coating with a $Y_2O_3$ composition had the poorest dusting resistance of all the examples.

The results in Example 2 demonstrated that, with the thermal spray material containing yttrium fluoride ($YF_3$), a portion underwent oxidation during thermal spraying and that yttrium fluoride and yttrium oxyfluoride were formed in the thermal sprayed coating. However, according to the results of the XPS analysis, it was found that the binding energy for the Y 3d orbital was seen at a position higher than 160 eV for this yttrium fluoride and yttrium oxyfluoride and a mixed crystal was thus not formed in the thermal sprayed coating.

While the thermal sprayed coating in Example 2 was found to have a relatively low porosity value at 3%, a structure composed of unmelted thermal spray material in a granular state was observed in part of the thermal sprayed coating. The thermal sprayed coating of Example 2 was found to have the worst plasma erosion resistance performance among the examples. In addition, it was found that the surface of the thermal sprayed coating in Example 2 was modified by the 1-hour plasma exposure and an approximately 10-nm modification layer was formed. The size of this modification layer was the second largest after Example 1, and it was confirmed that as a result the thermal sprayed coating with the composition $YF_3$ had a somewhat poorer dusting resistance.

The thermal spray material of Example 3 is a granule containing yttrium oxyfluoride with the composition given by YOF. With this thermal spray material, it was determined that yttrium oxide was produced in the thermal sprayed coating in a high proportion of at least 50% by thermal spraying. In addition, it was confirmed that with this thermal spray material, the fluorine in the oxyfluoride was volatilized by thermal spraying and the porosity in the obtained thermal sprayed coating ended up reaching a very high value at 9%. It is thought that this trend was promoted because the thermal spray material, being granular, had a high specific surface area and was then in a form that facilitated oxidation during thermal spraying. The plasma erosion resistance performance of the thermal sprayed coating in Example 3 was found to be poorer than in Example 1 but better than in Example 2. In addition, notwithstanding the fact that it contains YOF, which has an excellent dusting resistance, the thermal sprayed coating of Example 3 was found to have, due to its high porosity, a dusting resistance and state of modification layer formation about the same as in Example 2.

The thermal spray material of Example 4 is a granule containing yttrium oxyfluoride with the composition given by $Y_5O_4F_7$. It was confirmed that due to its granular form, the thermal spray material in Example 4 could remain in an unmelted form in the thermal sprayed coating even though it was heated in the thermal spray flame. This was also the same, regardless of the composition, for the thermal sprayed coatings obtained from the thermal spray materials in the Reference Example and Examples 1 to 3. With this thermal spray material, it was confirmed that, while $Y_5O_4F_7$ remained in the thermal sprayed coating provided by thermal spraying, a large portion was oxidized to YOF and a portion was oxidized to $Y_2O_3$. Furthermore, it was confirmed that because the thermal spray material itself contained a high proportion of fluorine and underwent volatilization during thermal spraying, the porosity of the resulting thermal sprayed coating assumed a value of 10%, which was higher than in Example 3. The thermal sprayed coating of Example 4 had about the same plasma erosion resistance performance as in Example 3 because it did not contain the $YF_3$ phase. However, due to the larger proportions of YOF and $Y_5O_4F_7$ than in Example 3, only a small modification layer of 5 nm was observed and a resistance to plasma-induced modification was demonstrated. However, due to the high porosity of 10%, the thermal sprayed coating of Example 4 had a dusting resistance that was about the same as in Examples 2 and 3 at C.

Figure 5A:
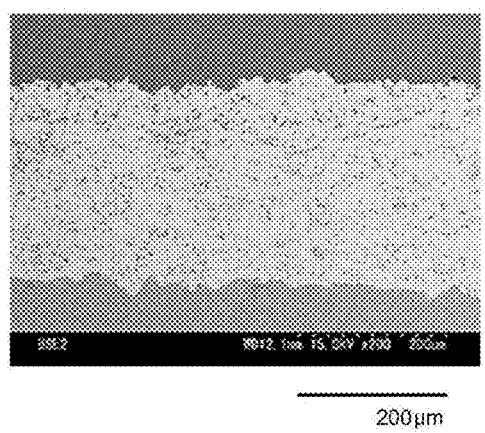
FIG. 5A is an observed image provided by observation, with a scanning electron microscope (SEM), of the cross section of a thermal sprayed coating obtained by the thermal spraying of the thermal spray material of Example 5.
Figure 5B:
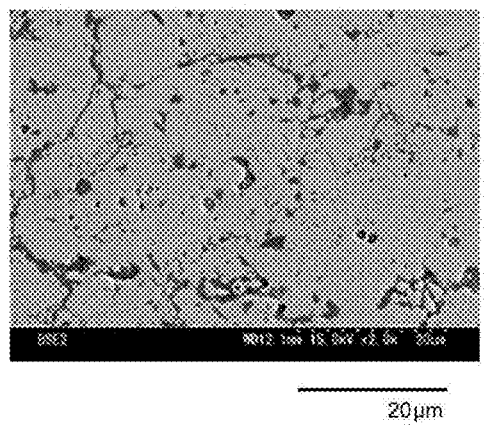
FIG. 5B is an enlargement of a part of FIG. 5A.

The thermal spray material of Example 5 is a powder of a yttrium oxyfluoride with the composition given by $Y_5O_4F_7$. This thermal spray material was composed of a monophase of $Y_5O_4F_7$ and mixed crystals were not formed therein, but a significantly low cumulative pore volume was confirmed because the starting powder was melted and unified. As a result, it was found that a thermal sprayed coating containing a $Y_5O_4F_7$ phase and YOF phase in total, in high proportions could be formed. In addition, while the composition of the thermal spray material was the same as Example 4, it was confirmed that the amount of YOF formed in the thermal sprayed coating was increased and the proportion oxidized to $Y_2O_3$ was reduced. In addition, it was found that the porosity of the thermal sprayed coating was also somewhat reduced at 8%. For reference, FIG. 5A is an image of a cross section of the thermal sprayed coating in Example 5 and FIG. 5B is a magnification of a portion thereof. With the thermal sprayed coating of this Example 5, while the plasma erosion resistance performance was increased to about the same level as Example 2, it was shown that the size of the modification layer was small at 5 nm.

The thermal sprayed coating of Example 6 is a powder of yttrium oxyfluoride. It could be confirmed that this thermal spray material, because its starting powder was melted and unified, had a significantly low cumulative pore volume. In addition, it was found as a result of XRD analysis that the thermal spray material of Example 6 contained a mixed crystal of $Y_5O_4F_7$ and $YF_3$. The solid solution ratio between the $Y_5O_4F_7$ and $YF_3$ in the mixed crystal was determined to be 80:20. It was found that with the thermal spray material of this Example 6 a large portion of the thermal sprayed coating was formed by $Y_5O_4F_7$. Moreover, although $Y_2O_3$ was present in a small amount in the thermal sprayed coating, it was otherwise YOF and was confirmed to be constituted of mostly yttrium oxyfluoride. It was found as a result of XPS analysis that the mixed crystal was also contained in the thermal sprayed coating itself of Example 6. It was found for this thermal sprayed coating that, due to a suppression of fluorine volatilization by thermal spraying in comparison to Examples 4 and 5, the porosity was significantly low at 5% and a compact thermal sprayed coating was formed. This is thought to occur because the thermal spray material of Example 6 contained a mixed crystal and oxidative decomposition to $Y_2O_3$ was inhibited. The thermal sprayed coating of Example 6 had about the same plasma erosion resistance performance as in Examples 3 and 4, but the formation of a modification layer was not observed upon plasma exposure and it was demonstrated that the amount of production of very small particles was kept very low with a dusting resistance of A.

Figure 6A:
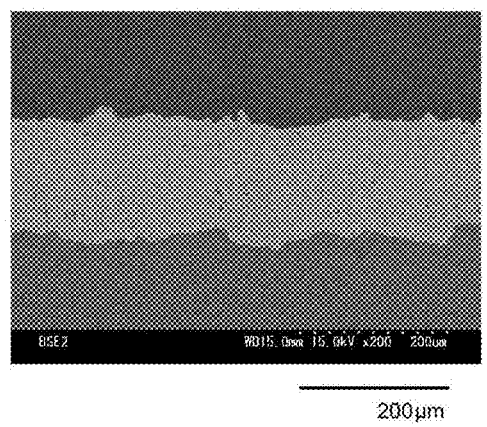
FIG. 6A is an observed image provided by SEM observation of the cross section of the thermal sprayed coating obtained by the thermal spraying of the thermal spray material of Example 8.
Figure 6B:
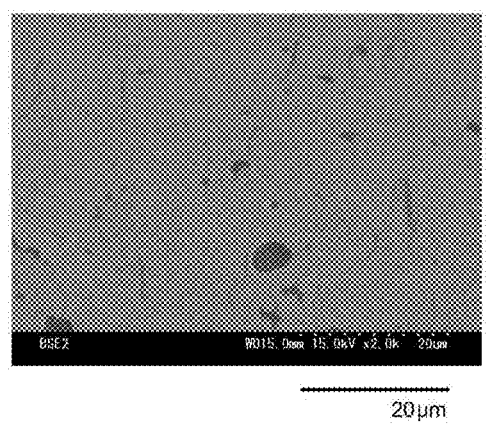
FIG. 6B is an enlargement of a part of FIG. 6A.

The thermal spray materials of Examples 7 and 8 are powders of yttrium oxyfluoride. These thermal spray materials also have very low cumulative pore volumes because the starting powder was melted and unified. According to the results of XRD analysis, these thermal spray materials were confirmed to contain a mixed crystal of $Y_5O_4F_7$ and $YF_3$, and the solid solution ratio between the $Y_5O_4F_7$ and $YF_3$ in the mixed crystal was determined to be 56:44 for the thermal spray material of Example 7 and 28:72 for the thermal spray material according to Example 8. Based on a comparison of Examples 6 to 8, when a thermal spray material containing this mixed crystal was thermal sprayed, it was recognized that, as the solid solution ratio for $YF_3$ was higher, the proportion of the $Y_5O_4F_7$ contained in the thermal sprayed coating increased. In addition, it was confirmed that the porosity of the thermal sprayed coating was also reduced by raising the solid solution ratio for the $YF_3$. FIG. 6A is an image of a cross section of the thermal sprayed coating in Example 8 and FIG. 6B is a magnification of a portion thereof. As is clear from a comparison with the thermal sprayed coating (8% porosity) of Example 5 given in FIGS. 5A and 5B, it could be confirmed that a very compact thermal sprayed coating had been formed.

In Example 8, the proportion for the $Y_5O_4F_7$ phase contained in the thermal sprayed coating is higher than the compositional proportion taken up by the $Y_5O_4F_7$ phase in the thermal spray material. Moreover, it is shown that, by using the thermal spray materials of Examples 7 and 8, which have higher solid solution ratios for the $YF_3$ than Example 6, $Y_2O_3$ is not formed in the thermal sprayed coating. It could be confirmed from this that the mixed crystal present in the thermal spray material is decomposed into $Y_5O_4F_7$ and YOF by the thermal spray environment. Thus, when the mixed crystal undergoes decomposition, it is thought that this occurs by the following: the composition of the mixed crystal gradually changes and, when oxidation progresses further, precipitation as the $Y_5O_4F_7$ constituting the mixed crystal occurs; also, when the $Y_5O_4F_7$ is oxidized, it decomposes after temporarily passing through YOF, which has a smaller proportion of fluorine. The thermal sprayed coatings of Examples 6, 7, and 8 had the same plasma erosion resistance performance; the formation of the modification layer was not seen with any of these; and these also had an excellent result for the dusting resistance of A or B. The fact that the dusting behavior of the thermal sprayed coating of Example 8 was a B is thought to be because the Y, O, and F composition approached that of $YF_3$.

The thermal spray materials in Examples 6* to 8* have the form of granular particles. However, it was confirmed from the XRD analytic results that each contained mixed crystals with the same composition as in Examples 6 to 8. As a result, it was found that $Y_2O_3$ was not formed in the thermal sprayed coatings obtained by the thermal spraying of the thermal spray materials of Examples 6* to 8* and that, due to the mixed crystal content, decomposition to an oxide of the thermal spray material during thermal spraying is suppressed even for the granular form. However, due to the thermal spray material being in granular form, the presence of unmelted particles in the thermal sprayed coating was confirmed, and as a result it was found that the porosity of the thermal sprayed coatings was somewhat high and the plasma erosion resistance performance and dusting behavior were ultimately worse than for the thermal sprayed coatings of Examples 6 to 8. However, it could be confirmed that both the plasma erosion resistance performance and the dusting behavior were better than for the thermal sprayed coatings in the Reference Example and Examples 1 to 4 and that, because the thermal spray materials contained the mixed crystals, a deterioration of the materials during thermal spraying was suppressed and high-quality thermal sprayed coatings could be formed.

Embodiment 2

The properties were investigated for thermal sprayed coatings obtained by carrying out thermal spraying under different thermal spraying conditions using the thermal spray materials of Examples 5, 6, and 7 prepared in Embodiment 1.

Thus, in Example 5A, a thermal sprayed coating was formed by high velocity thermal spraying using the thermal spray material of Example 5, an "SG-100" commercial plasma thermal sprayer (Praxair Surface Technologies), a mixed gas of 100 psi (0.69 MPa) argon gas and 110 psi (0.76 MPa) helium gas as the thermal spray gas, and conditions of a voltage of 41.6 V and a current of 900 A.

In Example 5B, a thermal sprayed coating was formed by performing thermal spraying using the thermal spray material of Example 5, an "F4" commercial plasma thermal sprayer (Sulzer Metco), a mixed gas of 50 NLPM argon gas and 10 NLPM hydrogen gas as the thermal spray gas, and conditions of a voltage of 70 V and a current of 600 A.

In Example 5C, a thermal sprayed coating was formed proceeding as in Example 5B using a voltage of 70 V and a current of 600 A for the plasma generation conditions at the thermal sprayer.

In Example 6A, a thermal sprayed coating was formed by carrying out high velocity thermal spraying using the thermal spray material of Example 6 and the same thermal spray conditions as in Example 5A.

In Example 6B, a thermal sprayed coating was formed by carrying out thermal spraying using the thermal spray material of Example 6 and the same thermal spray conditions as in Example 5B.

In Example 7A, a thermal sprayed coating was formed by carrying out thermal spraying using the thermal spray material of Example 7 and the same thermal spray conditions as in Example 5B.

The properties of the thusly obtained thermal sprayed coatings were investigated and the results are given in Table 3. The meaning of each row in Table 3 is the same as in Table 2.

TABLE 3

| | Example | 5 | 5A | 5B | 5C | 6 | 6A | 6B | 7 | 7A |
|---|---|---|---|---|---|---|---|---|---|---|
| thermal | particle size [μm] | | | −45 + 10 um | | | | −45 + 10 um | | −45 + 10 um |
| spray | composition | | | Y5O4F7 | | | | Y5O4F7/YF3 | | Y5O4F7/YF3 |
| material | element ratio Y | | | 31 | | | | 30 | | 29 |

TABLE 3-continued

| | Example | | 5 | 5A | 5B | 5C | 6 | 6A | 6B | 7 | 7A |
|---|---|---|---|---|---|---|---|---|---|---|---|
| | [atm %] | O | | | 25 | | | | 20 | | 14 |
| | | F | | | 44 | | | | 50 | | 57 |
| | molar ratio/solid | $Y_5O_4F_7$ | | | 100 | | | | 80 | | 56 |
| | solution ratio | YOF | | | 0 | | | | 0 | | 0 |
| | [mol %] | $YF_3$ | | | 0 | | | | 20 | | 44 |
| | | $Y_2O_3$ | | | 0 | | | | 0 | | 0 |
| | particle size | <20(%) | | | 10 | | | | 16 | | 23 |
| | distribution | D10 | | | 20 | | | | 18 | | 15 |
| | [μm] | D50 | | | 31 | | | | 30 | | 28 |
| | | D90 | | | 50 | | | | 51 | | 51 |
| | cumulative pore volume ($r \leq $ μm, cm$^3$/g) | | | | <0.01 | | | | <0.01 | | <0.01 |
| | powder type | | | | melted | | | | melted | | melted |
| thermal spray method | thermal spray device | | SG-100 | SG-100 | F4 | F4 | SG-100 | SG-100 | F4 | SG-100 | F4 |
| | thermal spray method | | | high velocity | | high output | | high velocity | | | |
| | thermal spray gas | | Ar/He | Ar/He | Ar/H2/N2 | Ar/H2/N2 | Ar/He | Ar/He | Ar/H2/N2 | Ar/He | Ar/H2/N2 |
| | shroud | | none | nor r | nor | nor r | none | none | none | none | none |
| thermal sprayed coating | porosity [%] | | 8 | 12 | 6 | 5 | 4 | 4 | 5 | 3 | 4 |
| | presence/absence of unmelted particles | | absent | absent | absent | absent | absent | absent | absent | absent | absent |
| | element ratio | Y | 33 | 33 | 36 | 35 | 33 | 33 | 33 | 33 | 33 |
| | [atm %] | O | 28 | 26 | 33 | 35 | 29 | 30 | 29 | 25 | 28 |
| | | F | 38 | 41 | 30 | 28 | 38 | 37 | 38 | 42 | 45 |
| | XRD intensity | $Y_5O_4F_7$ | 18 | 50 | 0 | 0 | 55 | 79 | 14 | 78 | 21 |
| | ratio [%] | YOF | 73 | 50 | 71 | 35 | 45 | 21 | 35 | 14 | 32 |
| | | $Y_2O_3$ | 10 | 0 | 29 | 65 | 0 | 0 | 26 | 0 | 22 |
| | | $YF_3$ | 0 | 0 | 0 | 0 | 0 | 0 | 0 | 0 | 0 |
| | | YOF system | 0 | 0 | 0 | 0 | 0 | 0 | 25 | 8 | 25 |
| | Y 3d orbital binding energy (eV) | 1st peak | 158 | 158.7 | 159 | 159 | 159 | 159 | 159 | 159 | 159 |
| | | 2nd peak | 158.7 | 158 | 157.3 | 157.1 | none | none | none | none | none |
| | plasma resistance (um/hr) | | 2.4 | 2.7 | 2.0 | 2.5 | 1.8 | 1.7 | 2.0 | 2.0 | 2.0 |
| | dust gereration behavior | | C | C | C | C | A | A* | A* | A | A |
| | modification layer (nm) | | 5 | 5 | 5 | 5 | not detected | not detected | not detected | not detected | not detected |

Evaluations

First, a comparison of Examples 5 and 5B showed that, due to the use of the F4 as the thermal sprayer and by changing the thermal spray gas to a nitrogen-containing gas, the thermal spray material composed of a $Y_5O_4F_7$ melted powder underwent a large change in composition during thermal spraying and large amounts of YOF phase and $Y_2O_3$ phase were detected in the thermal sprayed coating. However, as shown in Example 5A, by raising the output of the thermal sprayer, it could be seen that a trend was assumed wherein the change in the composition of the thermal sprayed coating was restrained in both cases. For the thermal sprayed coating in Examples 5B and 5C, the composition undergoes a large change from $Y_5O_4F_7$ and a $Y_2O_3$ phase is detected by XRD analysis. However, the results of the XRD analysis and XPS analysis confirmed that, with the thermal spray materials of Examples 5A to 5C, mixed crystals were formed in the thermal sprayed coating by being thermal sprayed and, the mixed crystal portion, modification layers were not formed in the thermal sprayed coatings upon plasma exposure. However, large differences were not seen between Example 5 and Examples 5A to 5C with regard to the status of modification layer formation and the plasma erosion resistance performance as a whole.

As shown for Examples 6 to 6B, on the other hand, it was found that, when a thermal spray material composed of a melted powder of a mixed crystal of $Y_5O_4F_7$ and $YF_3$ was used, thermal spraying could be carried out while maintaining a high amount of fluorine in the thermal sprayed coating. In addition, mixed crystals were also shown to be present in the thermal sprayed coating. For example, in Example 6B, by using the F4 for the thermal sprayer and changing the thermal spray gas to a nitrogen-containing gas, the composition of the thermal spray material undergoes alteration and a large amount of $Y_2O_3$ phase is detected in the thermal sprayed coating. However, based on the results of XRD and XPS, it was confirmed that this $Y_2O_3$ phase formed a mixed crystal with the other detected phases, e.g., $Y_5O_4F_7$, and that a modification layer was not formed in the thermal sprayed coating even in the case of plasma exposure. Moreover, with regard to the thermal sprayed coatings of Examples 6 to 6B, it was found that the same outstanding plasma erosion resistance performance and dusting resistance for when the thermal spray conditions were changed (Examples 6A and 6B) were also obtained in the ordinary thermal spray method (Example 6). Thus, it was shown that the plasma erosion resistance performance and dusting resistance coexisted at high levels because the thermal spray material contained a mixed crystal of $Y_5O_4F_7$.

It was thus shown for the thermal spray material of Example 6 that oxidative decomposition was favorably suppressed due to the presence of the mixed crystal and that, even when thermal spraying was not performed using special thermal spray conditions, a fully high-quality thermal sprayed coating was obtained by a common thermal spray method. However, as shown in Examples 6A and 6B, it was confirmed that, when the thermal spray material contained a mixed crystal, modification of the thermal sprayed coating was suppressed by additional alterations in the thermal spray conditions and thermal sprayed coatings having an outstanding dusting resistance were obtained.

The same can also be confirmed from a comparison of Example 7 with Example 7A. That is, in Example 7A, a large amount of $Y_2O_3$ phase is detected in the thermal sprayed coating due to the use of the F4 for the thermal sprayer and the change in the thermal spray gas to a nitrogen-containing gas. However, it was confirmed that this $Y_2O_3$ phase formed a mixed crystal with, e.g., the $Y_5O_4F_7$ phase, and a constitution could be realized that was resistant to the formation of a modification layer in the thermal sprayed coating even upon plasma exposure.

Embodiment 3

In Embodiment 3, thermal sprayed coatings were formed by variously changing the thermal spray conditions, using, structure and is provided with ports for the injection of an inert gas at two locations, i.e., on the upstream side of the cylinder and at the outlet. The thermal sprayed coating was formed by thermal spraying using a mixed gas of argon gas/hydrogen gas/nitrogen gas as the thermal spray gas in thermal spraying. Argon (Ar) gas was used as the shroud gas in Examples 8A and 8C. Nitrogen ($N_2$) gas was used as the shroud gas in Examples 8B and 8D.

The properties of the thusly obtained thermal sprayed coatings were investigated and the results are given in Table 4. The meaning of each row in Table 4 is the same as in Table 2.

TABLE 4

| | Example | | 8 | 8a | 8b | 8A | 8B | 8C | 8D |
|---|---|---|---|---|---|---|---|---|---|
| thermal spray material | particle size [μm] | | | | −45 + 10 um | | | −25 + 5 um | |
| | composition | | | | Y5O4F7/YF3 | | | Y5O4F7/YF3 | |
| | element ratio [atm %] | Y | | | 27 | | | 27 | |
| | | O | | | 7 | | | 7 | |
| | | F | | | 67 | | | 67 | |
| | molar ratio/solid solution ratio [mol%] | Y5O4F7 | | | 28 | | | 28 | |
| | | YOF | | | 0 | | | 0 | |
| | | YF3 | | | 72 | | | 72 | |
| | | Y2O3 | | | 0 | | | 0 | |
| | particle size distribution [μm] | <20(%) | | | 21 | | | 65 | |
| | | D10 | | | 16 | | | 12 | |
| | | D50 | | | 27 | | | 18 | |
| | | D90 | | | 45 | | | 26 | |
| | cumulative pore volum (r ≤ μm, $cm^3$/g) | | | | <0.01 | | | <0.01 | |
| | powder type | | | | melted | | | melted | |
| thermal spray method | thermal spray device | | SG-100 | F4 | F4 | F4 | | F4 | |
| | thermal splay method | | | | high output | | | | |
| | thermal spray gas | | Ar/He | Ar/H2/N2 | Ar/H2/N2 | Ar/H2/N2 | | Ar/H2/N2 | |
| | shroud | | none | none | none | Ar | N2 | Ar | N2 |
| thermal sprayed coating | porosity [%] | | 3 | 3 | 3 | 3 | 3 | 3 | 3 |
| | presence/absence of unmelted particles | | absent | absent | absent | absent | absent | absent | absent |
| | element ratio [atm %] | Y | 33 | 28 | 28 | 28 | 29 | 40 | 40 |
| | | O | 14 | 17 | 19 | 15 | 16 | 25 | 27 |
| | | F | 54 | 55 | 53 | 57 | 55 | 55 | 52 |
| | XRD intensity ratio [%] | Y5O4F7 | 58 | 65 | 61 | 82 | 78 | 38 | 31 |
| | | YOF | 33 | 0 | 0 | 0 | 0 | 26 | 28 |
| | | Y2O3 | 0 | 0 | 0 | 0 | 0 | 20 | 19 |
| | | YF3 | 0 | 0 | 0 | 0 | 0 | 0 | 0 |
| | | YOF system | 9 | 35 | 39 | 18 | 22 | 21 | 21 |
| | Y 3d orbital binding energy (eV) | 1st peak | 159 | 159 | 159 | 159 | 159 | 159 | 159 |
| | | 2nd peak | none | none | none | none | none | none | none |
| | plasma resistance (um/hr) | | 2.1 | 2.2 | 2.3 | 2.1 | 2.1 | 2.1 | 2.1 |
| | dust generation behavior | | B | A | A | A | A | B | B |
| | modification layer (nm) | | not detected | 7 | 8 | 6 | 8 | 6 | 7 | as the thermal spray materials, the thermal spray materials (Examples 8a, 8b, 8A, and 8B) of Example 8 prepared in the aforementioned Embodiment 1 and using thermal spray materials (Examples 8C and 8D) composed of melted powders obtained using a smaller particle diameter for the granular particles provided by granulation in the production of the thermal spray material according to Example 8. In Examples 8a and 8b, an "F4" commercial plasma sprayer (Sulzer Metco) was used as the thermal sprayer as in Embodiment 2 and thermal spraying was carried out at different outputs. In addition, in Examples 8A to 8D, a tapered metal cylindrical shroud device was used laterally attached to the barrel tip of the "F4" thermal sprayer. This shroud device is constituted of a water-coolable double-tube Because the thermal spray material of Example 8 contained mixed crystals, it was confirmed that the thermal sprayed coatings were formed by mixed crystals in all of the examples, regardless of the thermal spray device and the thermal spray conditions. In addition, it was found that, because thermal spraying could be carried out while maintaining a high fluorine content in the thermal sprayed coatings, the same compact thermal sprayed coating with a porosity of just 3% obtained when the thermal spray device was changed (Examples 8a and 8b) and when a shroud device was also used (Examples 8A to 8D), was also obtained for a common thermal spray method (Example 8).

Based on a comparison of Examples 8, 8a, and 8b, it was found that, when the thermal spray device was changed from the SG-100 to the F4, oxygen was introduced in large amounts into the composition of the thermal sprayed coating and the proportion of $Y_5O_4F_7$ was increased. Moreover, when the F4 thermal spray device was used under high-output conditions, it was confirmed based on the XRD results that a relatively oxygen-rich Y—O—F phase was detected and the proportion of introduction of oxygen into the thermal sprayed coating was increased. However, because mixed crystals were formed in the thermal sprayed coatings, it was found that the dusting resistance when the thermal sprayed coatings were exposed to the plasma was enhanced. Moreover, as shown in Examples 8A to 8D, it could be confirmed that, by using a shroud device and converting to a shrouded thermal spray, oxidation of the thermal sprayed coating was suppressed even with the use of the F4. Examples 8C and 8D are thermal spray materials having finer particle sizes, and ordinarily oxidation would be promoted by thermal spraying. However, in Examples 8C and 8D, it was found that, by adopting a shrouded thermal spraying, while the dusting resistance was somewhat poorer, an excellent thermal sprayed coating could be formed in terms of the plasma erosion resistance performance and so forth. Regardless of the particle size of the thermal spray material, modification layer formation upon plasma exposure of the thermal sprayed coating was more suppressed with the use of Ar gas as the shroud gas than with the use of nitrogen gas, and a thermal sprayed coating with a better dusting resistance could be formed.

Based on the preceding, the herein disclosed thermal spray material, which does not contain a rare earth element oxide, was also confirmed to be resistant to oxidation in thermal spray usage. With regard to this inhibitory effect on oxidation, it was found that oxidation, even by ordinary thermal spraying, was inhibited regardless of the thermal spraying method. Due to this, the presence of a rare earth element oxide in the thermal sprayed coating can be inhibited and a thermal sprayed coating can be formed in which the main component is rare earth element oxyfluoride. As a consequence of this, a thermal sprayed coating and a thermal spray coated article can be provided that exhibit both a plasma erosion resistance performance and resistance to dusting.

Specific examples of the present invention are described in detail in the preceding, but these are nothing more than examples and do not limit the claims. The art described in the claims includes diverse modifications and alterations of the specific examples provided above as examples.

What is claimed is:

1. A thermal spray material comprising a rare earth element, oxygen, and a halogen element as constituent elements, and comprising a mixed crystal of a rare earth element oxyhalide and a rare earth element halide.

2. The thermal spray material according to claim 1, substantially being free from a rare earth element halide that is a halide of the rare earth element.

3. The thermal spray material according to claim 1, substantially being free from a rare earth element oxide that is an oxide of the rare earth element.

4. The thermal spray material according to claim 1, substantially being free from the rare earth element oxyhalide.

5. The thermal spray material according to claim 1, wherein the mixed crystal comprises the rare earth element halide in the range of at least 5 mol % and not more than 95 mol %.

6. The thermal spray material according to claim 1, comprising yttrium as the rare earth element, comprising fluorine as the halogen element, comprising yttrium oxyfluoride as the rare earth element oxyhalide, and comprising yttrium fluoride as the rare earth element halide.

7. The thermal spray material according to claim 1, comprising a powder having an average particle diameter of at least 5 μm and not more than 60 μm.

8. The thermal spray material according to claim 7, wherein the cumulative pore volume in the powder for pore radii equal to or less than 1 μm is not more than 0.1 cm3/g.

* * * * *